US012529837B2

United States Patent
Harrison et al.

(10) Patent No.: US 12,529,837 B2
(45) Date of Patent: Jan. 20, 2026

(54) SYSTEMS AND METHODS FOR LIGHTING AN E-PAPER DISPLAY

(71) Applicant: KORRUS, INC., Los Angeles, CA (US)

(72) Inventors: Benjamin Harrison, Los Angeles, CA (US); Paul Kenneth Pickard, Los Angeles, CA (US)

(73) Assignee: KORRUS, INC., Los Angeles, CA (US)

( * ) Notice: Subject to any disclaimer, the term of this patent is extended or adjusted under 35 U.S.C. 154(b) by 0 days.

(21) Appl. No.: 18/670,289

(22) Filed: May 21, 2024

(65) Prior Publication Data

US 2025/0020858 A1     Jan. 16, 2025

Related U.S. Application Data

(63) Continuation of application No. 17/859,073, filed on Jul. 7, 2022, now Pat. No. 11,988,864, which is a continuation of application No. PCT/US2021/012738, filed on Jan. 8, 2021.

(60) Provisional application No. 62/958,574, filed on Jan. 8, 2020.

(51) Int. Cl.
*F21V 8/00* (2006.01)
*G02F 1/16757* (2019.01)

(52) U.S. Cl.
CPC ........ *G02B 6/0068* (2013.01); *G02F 1/16757* (2019.01)

(58) Field of Classification Search
CPC .......................... G02B 6/0068; G02F 1/16757
See application file for complete search history.

(56) References Cited

U.S. PATENT DOCUMENTS

| 9,406,277 | B1* | 8/2016 | Letourneur | G09G 5/10 |
| 9,837,852 | B1* | 12/2017 | Barnes | F21V 7/22 |
| 2012/0193551 | A1* | 8/2012 | Christophersen | H01J 3/14 250/397 |
| 2012/0230055 | A1* | 9/2012 | Ho | G02B 6/0055 362/609 |
| 2018/0338359 | A1 | 11/2018 | Soler | |
| 2019/0254142 | A1* | 8/2019 | Petluri | H05B 45/20 |
| 2019/0353328 | A1* | 11/2019 | Pickard | G02B 6/0045 |
| 2019/0353975 | A1 | 11/2019 | Didomenico | |

FOREIGN PATENT DOCUMENTS

WO     2020097575     5/2020

OTHER PUBLICATIONS

International Preliminary Report on Patentability mailed Jul. 12, 2022, in International Application No. PCT/US21/12738, 10 pages.
International Search Report and Written Opinion of the International Searching Authority mailed Mar. 29, 2021 in International Application No. PCT/US21/12738, 12 pages.

\* cited by examiner

*Primary Examiner* — Mary Ellen Bowman
(74) *Attorney, Agent, or Firm* — FisherBroyles LLP

(57) ABSTRACT

A method includes determining a first amount of equivalent melanopic lux (EML) based on an actual time of day or an intended time of day, providing, via one or more sources, light configured to emit a first set of spectra that causes the first amount of EML and providing a light guide configured to receive and reflect the light toward an electronic paper (e-paper) display, the light guide being in front of the e-paper display in relation to the reader.

19 Claims, 13 Drawing Sheets

SYSTEMS AND METHODS FOR LIGHTING AN E-PAPER DISPLAY

CROSS REFERENCE TO RELATED APPLICATIONS

This application claims the benefit of U.S. Provisional Patent Appl. No. 62/958,574, filed Jan. 8, 2020 the entire disclosure of which is incorporated herein by reference.

TECHNICAL FIELD

The present disclosure relates generally to systems and methods for adjusting biological activity via artificial lighting of an electronic paper (e-paper) display.

BACKGROUND

E-readers are known as mobile, electronic devices and are designed primarily for the purpose of reading digital copies of books and periodicals. There exist the KINDLE family of devices by Amazon.com and the NOOK family of devices by Barnes & Noble, Inc. of New York City, N.Y. Some versions of e-readers do not require artificial illumination, whereas others are supported by self-illumination, e.g., with front or back lighting. Their displays are often grayscale but some e-readers provide color.

Circadian rhythms are biological processes that are generated and regulated by a brain-based biological clock. These biological processes include body temperature, digestion, release of certain hormones, and a person's wake/sleep cycle. In the absence of external cues, circadian rhythms in humans run about every 24 hours. Based on particular light exposures, a person's circadian rhythm may become desynchronized (e.g., with the local day-night cycle). The circadian system is more sensitive to short-wavelength (blue) light so prolonged exposure to such light can affect various bio-physiological functions.

Light exposure at night can suppress the secretion of the hormone melatonin and can cause people to stay alert, thus delaying an ability to sleep. Many people spend significant time in front of a display, like that of e-readers, which may harm circadian rhythms (e.g., by stimulating blue-light-sensitive ganglion cell photoreceptors), degrade sleep quality, and impair alertness a following day. Certain light can exacerbate development of cataracts, eyelid cancer, pterygium and soft drusen, and age-related macular degeneration (AMD). Visible blue light may even be harmful to the human retina. And children are more severely affected by such media use as watching TV, playing computer games, or looking at online content. There is thus a need to better control light exposure from user devices and to better maintain synchronization or entrainment to a 24 hour cycle.

SUMMARY

Systems and methods are disclosed for supporting different levels of biological activity, e.g., via provision of a set of illumination modes. Accordingly, one or more aspects of the present disclosure relate to a method for: determining a first amount of equivalent melanopic lux (EML) based on an actual time of day or an intended time of day; providing, via one or more sources, light configured to emit a first set of spectra that causes the first amount of EML; providing a light guide configured to receive and reflect the light toward an electronic paper (e-paper) display, the light guide being in front of the e-paper display in relation to the reader; and providing other light configured to emit a second set of spectra that causes a second amount of EML, the second amount of EML being determined based on a different time.

The method is implemented by a system comprising one or more hardware processors configured by machine-readable instructions and/or other components. The system comprises the one or more processors and other components or media, e.g., upon which machine-readable instructions may be executed. Implementations of any of the described techniques and architectures may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure.

DETAILED DESCRIPTION

Figure 1:
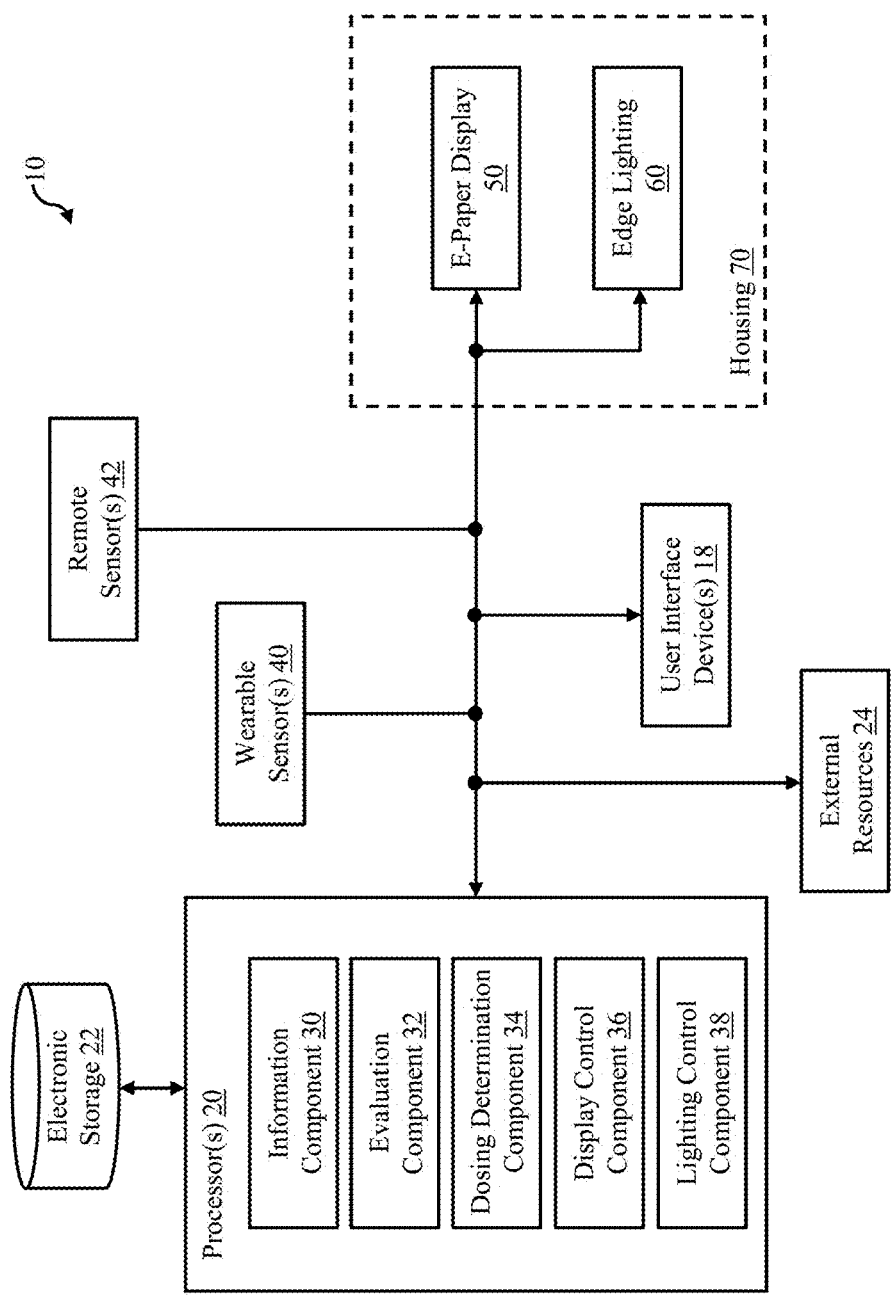
FIG. 1 illustrates an example of a system in which biologically active lighting is strategically delivered to a reader of an electronic paper (e-paper) display, in accordance with one or more exemplary implementations.

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

These drawings may not be drawn to scale and may not precisely reflect structure or performance characteristics of any given exemplary implementation, and should not be interpreted as defining or limiting the range of values or properties encompassed by exemplary implementations.

Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

Presently disclosed are ways of combatting harmful effects of artificial light (e.g., from electronic display devices, including e-readers or fixed, display devices of hospital rooms' medical instrumentation) because such light is responsible in delaying the onset of sleep of readers. FIG. 1 illustrates system 10 configured to affect biological activity (e.g., melanoma secretion, pupil diameter, or other measurable attribute) of a reader. System 10 may comprise processor(s) 20, electronic storage 22, external resources 24, wearable sensor(s) 40, remote sensor(s) 42, e-paper display 50, and housing 70, which may include edge lighting 60 (and which may form part of a same device that comprises processor 20). In some exemplary implementations, housing 70 may comprise a plurality of displays, including, e.g., left and right screens.

The disclosed e-paper display may be illuminated with light, without requiring a full range of colors (e.g., reds, greens, blues, and everything in between). That is, to make a white background light or another background light that diverges somewhat from white light, disclosed exemplary implementations do not need to be able to display content in all of those places at a same time. In general, light corresponding to a correlated color temperature (CCT) of about kelvin (K) to about 6,500 K is considered to be white light.

In some exemplary implementations, e-paper display 50 and edge lighting 60 may cause grayscale displays, which are free from gamut considerations of color displays and free from color quality concerns as seen in general illumination applications. Due to being so unconstrained, dosing determination component 34 of processor(s) 20 may select spectra producing background color that is acceptable to the reader. This selected spectra may further either maximize or minimize biological impacts, or the selection may comprise a blend therebetween.

The biological effects of light on humans may be measured in equivalent melanopic lux (EML). Lower EML values from electric lighting may be beneficial in the evening and at night to reduce unwanted health effects linked to melatonin suppression from certain light (e.g., at the wrong time). The term circadian-stimulating energy (CSE) more generally refers herein to any characteristics of a spectral power distribution (SPD) that may biologically affect a subject. For example, edge lighting 60 may generate CSE including one or more of circadian stimulus (CS), circadian illuminance (CLA), EML, blue light hazard (BLH), circadian efficacy of radiation (CER), circadian action factor (CAF), luminous efficacy of radiation (LEF), circadian power, circadian flux, and power of one or more other wavelength ranges. The application of CSE (and/or an antidote to CSE) to biological systems in an amount, aliquot, or volume may be referred to as dosing. CSE dosing may be applied, e.g., with light having a wavelength between 464 and 510 nanometers (nm).

In some instances, exposure to a quantity of blue light may be involved in damage in human eyes. BLH is a known risk and the measure of BLH provides a measure of potential for a photochemical induced retinal injury that results from radiation exposure. Such exposure is one factor which has been linked to photoreceptor damage. It has been reported that the blue light appears to decrease adenosine triphosphate (ATP) energy production in retinal ganglion cells. This has a negative effect on mitochondrial function and oxidative stress which has been shown to decrease survival of ganglion cells. As ganglion cells play a major role in synchronizing circadian rhythms, their destruction inhibits the eye's ability to determine length-of-day and length-of-night. Retinal ganglion cell death further leads to impaired vision. There is also increasing evidence that excessive blue light exposure may cause damage in human skin; it may contribute to wrinkles, worsening skin laxity, and pigmentation issues. When blue light penetrates the skin it can damage DNA, leading to inflammation, the breakdown of healthy collagen and elastin, and hyperpigmentation. It is also reported that excessive blue light at night negatively affects the human body's natural sleep cycle.

Blue light is not the only light in the visible spectrum that can be used to affect biophysiological functions of the human body. Recent studies indicate that therapy which may include doses of long red and near-IR: Long red typically has a spectrum that ranges from >625 nm to <700 nm with peak wavelengths >640-670 nm, and near-infrared (NIR) typical ranges from >700 nm and <1400 nm (with typical peak wavelengths: 850 nm, 940 nm, 1064 nm). Such light may affect bio-physiological functions by improving eye health, skin health, hair growth, and cognitive function. The spectral sensitivity corresponding to the human eye can be considered to be based on the color-matching functions of the 1931 Standard Observer (XYZ-tristimulus values for CIE 1931 2° color-matching), which show that the effect of light above 700 nm on color perception to be substantially negligible. In other words, it will have no significant impact on the overall (ccx, ccy) color point on the 1931 international commission on illumination (CIE) chromaticity diagram of emitted light from a lighting system. In some aspects, the present disclosure relates to long red and near infrared lighting channels that can provide long red and near infrared energy ("LRNE"). Long red and near infrared channels can provide one or both of Visible LRNE and non-visible LRNE. Visible LRNE refers to light having spectral power in wavelengths between about 625 nm and about 700 nm. Non-Visible LRNE refers to light having spectral power in wavelengths greater than or equal to about 700 nm. The long red and NIR channels of the present disclosure can be part of one or more red channels involved in color-tuning and providing white light, or as separate channel that can be operated independently of color-tuning requirements. How the human eye perceives red, long red and near infrared in a given individual may vary based on a plethora of factors including but not limited to age, stimulation of eye before exposure, eye health and health in general. Accordingly, there will be an overlap between the end of long red and the beginning of near infrared. Those of ordinary skill in the art and the skilled artisan will recognize variation is narrow and does not create substantial uncertainty in the terms. Hence the terminology LRNE is encompasses the entirety of both long red and near-infrared Additionally, LRNE may be beneficial by reducing, limiting, counteracting or ameliorating some of the negative effects associated with excessive blue light exposure. Disclosed herein are methods and systems to provide therapeutic doses of LRNE either to address a biological condition or as a prophylactic or health supplement means to limit or prevent at least one of an emotional, neurological, immune, and biological condition or system. Bioactive exposure refers to one or both of LRNE and CSE and directing at least one of LRNE and CSE at a biological system which may be a specific organ or any part of the body The bioactive exposure may be controlled by a control system (e.g., one or more components of processor 20) that receives inputs, including fixed and dynamically changing values, from a variety of sources and the control system may apply at least one of LRNE and CSE in accordance with said control system. Control input data is at least one of input by: readers, server, database, derived from a decisioning engine and collected by at least one sensor. The inputs are provided to a processor via signal communication. The processor may be local to the therapeutic device, remote from the therapeutic device or the processing may take place both locally and remote from the therapeutic device. Control systems disclosed herein may adjust the amount and timing of aliquots of bioactive exposure. The control of aliquots and frequency in response to input may be used to dynamically adjust the therapeutic or health supplement application of CSE or LRNE to readers. Dynamic adjustment of bioactive exposure to a reader may be viewed as personalized whereby data harvested from sensors in the lighting installation environment as well as sensors that reflect information about readers, such as one or more of physiological sensors (e.g., sensors 40 and 42). The control system may have modules within the platform which may connect to or integrate with data sources of information about readers as described below.

Disclosed herein are additional methods and systems to provide bioactive exposure as one of a supplement and therapeutic dose of LRNE to:
  A. Lessen the effect of age-related macular degeneration by stimulating mitochondria in retinal ganglion eye cells to produce more ATP energy. The increase in ATP production has been shown to slow the decline in vision associated with aging. LRNE may additionally improve the effects of glaucoma, a condition that destroys ganglion eye cells, by protecting the cornea and the retina.
  B. Address a biological condition or as a prophylactic or supplement means to limit or prevent a biological condition. Examples include, but are not limited to, preventing fluid buildup in the front of the eye, a main complication of glaucoma known to result in cell death of ganglion cells. LRNE has been shown to prevent the death of retinal ganglion cells when the optic nerve has been damaged, thereby preventing vision loss that would otherwise occur.
  C. improve skin health and appearance by the application of LRNE therapy. LRNE can reduce acute and chronic inflammation by increasing blood flow to damaged tissues. LRNE may be applied to increase natural collagen production, resulting in younger, healthier looking skin. Rats that were exposed to doses of LRNE experienced an increase in collagen synthesis and neoformed bone. Patients dealing with acne or depigmentation conditions, such as vitiligo, may benefit from undergoing LRNE therapy, as it can control sebum production (which leads to acne), and it can stimulate melanocyte proliferation (which enhances skin re-pigmentation). Skin that has been wounded, burned, or scarred also repairs more rapidly if it is exposed to LRNE, as red light significantly increases tensile strength and wound contraction while decreasing inflammation.
  D. A myriad of other bio-physiological function are impacted by LRNEs, including but not limited to, hair growth and cognitive function. LRNE therapy may be used in conjunction with or as an alternative treatment to hormone regulating drugs typically used to treat hair loss. LRNE exposure has been shown to be a treatment in terms of hair regrowth. Research has also demonstrated that LRNE exposure may lead to improved cognitive function with few side effects. In one study, those exposed to LRNE experienced quicker reaction times, better memory, a more positive mood, and the ability to learn new information faster. These beneficial effects on the human brain may be related to LRNE's increasing cerebral blood flow and oxygen availability and boost ATP energy production.
  E. LRNE therapy may be able to counteract, limit or ameliorate the negative effects from excessive CSE and blue light exposure. When humans absorb natural blue light from the sun, they also absorb natural red light from the sun, the two together providing numerous health benefits. However, an overload of artificial blue light such as CSE by itself may be determinantal. This damage can be mitigated through LRNE exposure.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., user interface (UI) device 18, processor 20, etc.). In some exemplary implementations, electronic storage 22 may be located in a server together with processor 20, in a server that is part of external resources 24, in UI devices 18, and/or in other locations. Electronic storage 22 may comprise a memory controller and one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 22 may store software algorithms, information obtained and/or determined by processor 20, information received via UI devices 18 and/or other external computing systems, information received from external resources 24, and/or other information that enables system 10 to function as described herein.

External resources 24 may include sources of information (e.g., databases, websites, etc.), external entities participating with system 10, one or more servers outside of system 10, a network, electronic storage, equipment related to Wi-Fi technology, equipment related to Bluetooth® technology, data entry devices, a power supply (e.g., battery powered or line-power connected, such as directly to 110 volts AC or indirectly via AC/DC conversion), a transmit/receive element (e.g., an antenna configured to transmit and/or receive wireless signals), a network interface controller (NIC), a display controller, a graphics processing unit (GPU, e.g., which may perform some of the functionality attributed to processor(s) 20), and/or other resources. In some implementations, some or all of the functionality attributed herein to external resources 24 may be provided by other components or resources included in system 10. Processor 20, external resources 24, UI device(s) 18, electronic storage 22, a network, and/or other components of system 10 may be configured to communicate with each other via wired and/or wireless connections, such as a network (e.g., a local area network (LAN), the Internet, a wide area network (WAN), a radio access network (RAN), a public switched telephone network (PSTN), etc.), cellular technology (e.g., GSM, UMTS, LTE, 5G, etc.), Wi-Fi technology, another wireless communications link (e.g., radio frequency (RF), microwave, infrared (IR), ultraviolet (UV), visible light, cm wave, mm wave, etc.), a base station, and/or other resources.

UI device(s) 18 of system 10 may be configured to provide an interface between one or more readers and system 10. UI devices 18 are configured to provide information to and/or receive information from the one or more readers. UI devices 18 include a user interface and/or other components. The UI may be and/or include a graphical UI (GUI) configured to present views and/or fields configured to receive entry and/or selection with respect to particular functionality of system 10, and/or provide and/or receive other information. In some exemplary implementations, the UI of UI devices 18 may include a plurality of separate interfaces associated with processors 20 and/or other components of system 10. Examples of interface devices suitable for inclusion in UI device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that UI devices 18 include a removable storage interface. In this example, information may be loaded into UI devices 18 from removable storage (e.g., a smart card, a flash drive, a removable disk) that enables readers to customize the implementation of UI devices 18.

In some exemplary implementations, UI devices 18 are configured to provide a UI, processing capabilities, databases, and/or electronic storage to system 10. As such, UI devices 18 may include processors 20, electronic storage 22, external resources 24, and/or other components of system 10. In some exemplary implementations, UI devices 18 are connected to a network (e.g., the Internet). In some exemplary implementations, UI devices 18 do not include processor 20, electronic storage 22, external resources 24, and/or other components of system 10, but instead communicate with these components via dedicated lines, a bus, a switch, network, or other communication means. The communication may be wireless or wired. In some exemplary implementations, UI devices 18 are laptops, desktop computers, smartphones, tablet computers, and/or other UI devices.

Data and content may be exchanged between the various components of the system 10 through a communication interface and communication paths using any one of a number of communications protocols. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol Version 4 (IPv4) and Internet Protocol Version 6 (IPv6).

In some exemplary implementations, processor(s) 20 may be communicable coupled to edge lighting 60 and e-paper display 50. In some exemplary implementations, processor(s) 20, e-paper display 50, and/or edge lighting 60 may each form part (e.g., in a same or separate housing) of a user device, a consumer electronics device, a mobile phone, a smartphone, a personal data assistant, a digital tablet/pad computer, a wearable device (e.g., watch), augmented reality (AR) goggles, virtual reality (VR) goggles, a reflective display, a visor, a personal computer, a laptop computer, a notebook computer, a work station, a server, a high performance computer (HPC), a vehicle (e.g., embedded computer, such as in a dashboard or in front of a seated occupant of a car or plane), a game or entertainment system, a set-top-box, any luminaire, a monitor, a television (TV), a panel, a space craft, or any other device. Housing 70, which may comprise within it edge lighting 60 and e-paper display 50, may include or exclude processor(s) 20 and/or other components of system 10.

In some exemplary implementations, processor(s) 20 may be configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some exemplary implementations, processor 20 may comprise a plurality of processing units. These processing units may be physically located within the same device (e.g., a server), or processor 20 may represent processing functionality of a plurality of devices operating in coordination (e.g., one or more servers, UI devices 18, devices that are part of external resources 24, electronic storage 22, and/or other devices).

As shown in FIG. 1, processor 20 is configured via machine-readable instructions to execute one or more computer program components. The computer program components may comprise one or more of information component 30, evaluation component 32, dosing determination component 34, display control component 36, lighting control component 38, and/or other components. Processor 20 may be configured to execute components 30, 32, 34, 36, and/or 38 by: software; hardware; firmware; some combination of software, hardware, and/or firmware; and/or other mechanisms for configuring processing capabilities on processor 20.

It should be appreciated that although components 30, 32, 34, 36, and 38 are illustrated in FIG. 1 as being co-located within a single processing unit, in exemplary implementations in which processor 20 comprises multiple processing units, one or more of components 30, 32, 34, 36, and/or 38 may be located remotely from the other components. For example, in some exemplary implementations, each of processor components 30, 32, 34, 36, and 38 may comprise a separate and distinct set of processors. The description of the functionality provided by the different components 30, 32, 34, 36, and/or 38 described below is for illustrative purposes, and is not intended to be limiting, as any of components 30, 32, 34, 36, and/or 38 may provide more or less functionality than is described. For example, one or more of components 30, 32, 34, 36, and/or 38 may be eliminated, and some or all of its functionality may be provided by other components 30, 32, 34, 36, and/or 38. As another example, processor 20 may be configured to execute one or more additional components that may perform some or all of the functionality attributed below to one of components 30, 32, 34, 36, and/or 38.

Figure 3:
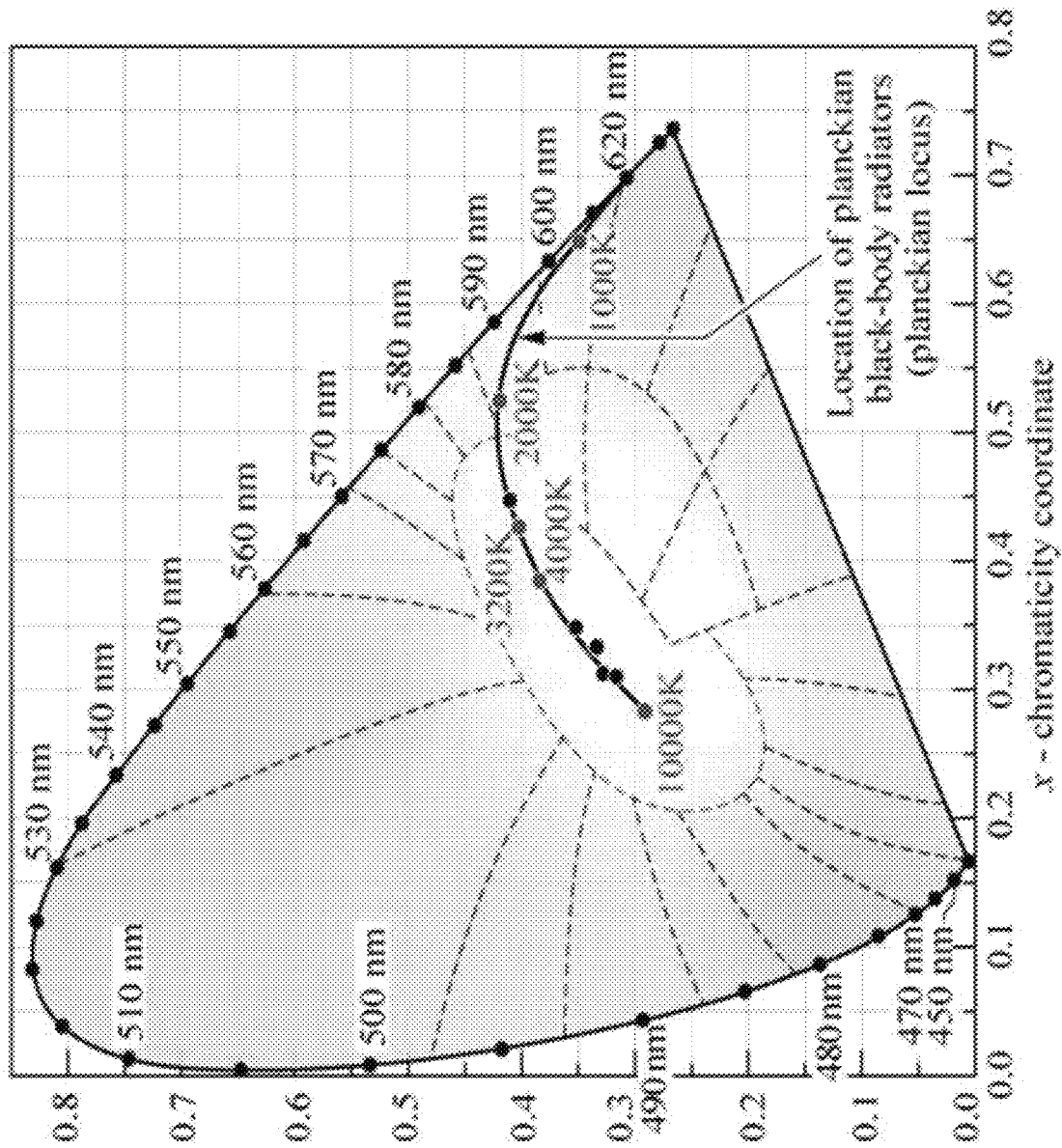
FIG. 3 illustrates the color space having regions for various different light temperatures that may be provided by the display, in accordance with the prior art.
Figure 4:
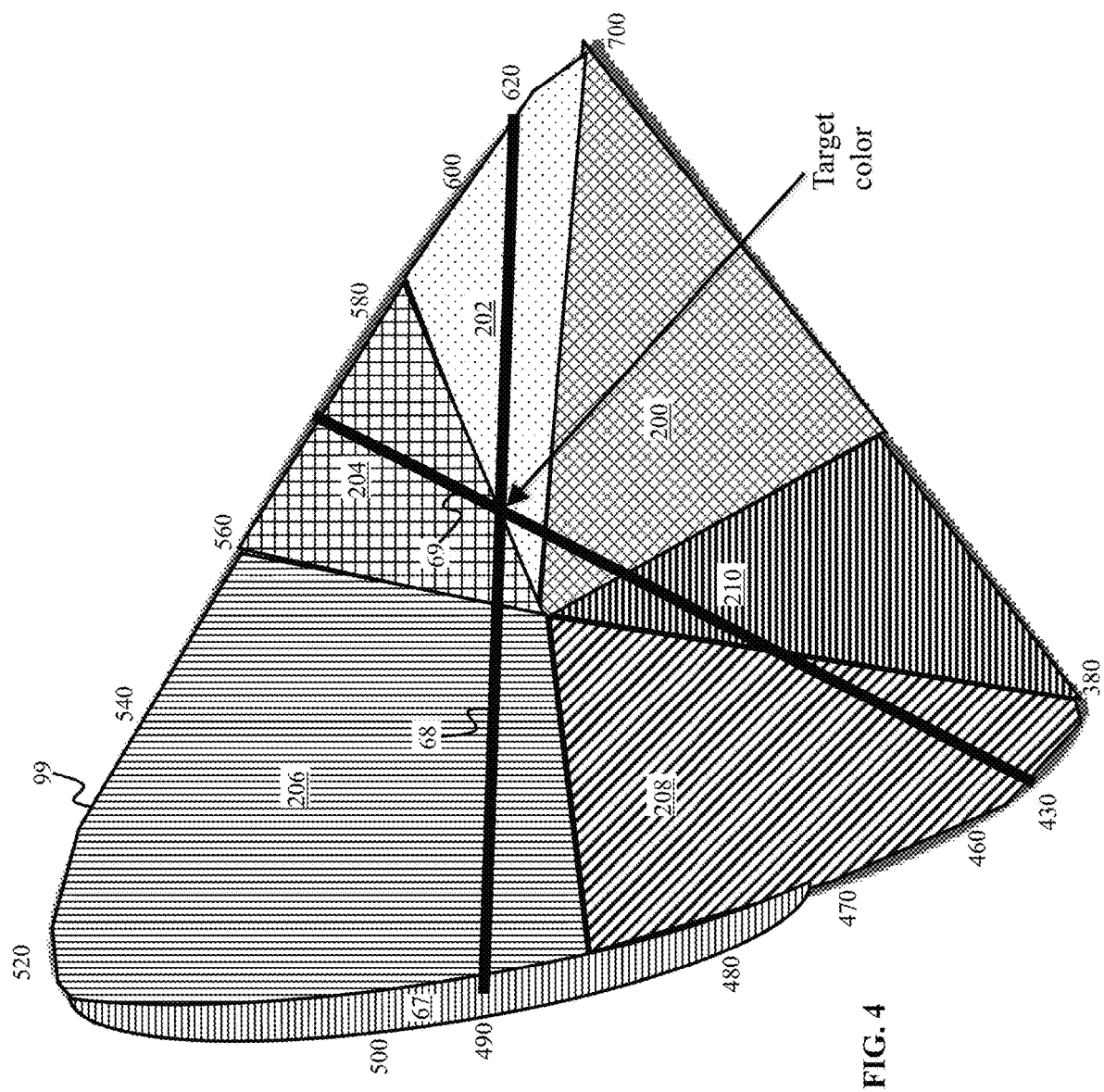
FIG. 4 illustrates a color space having differently characterized color regions to depict different lines at which color may be provided in respectively different modes, in accordance with one or more exemplary implementations.

Chromaticity is an objective specification of the quality of a color regardless of its luminance. Chromaticity may be characterized by hue and colorfulness (or saturation) parameters. Light emitted by edge lighting 60 may be represented by points plotted on a chromaticity diagram, such as the 1931 CIE chromaticity coordinate system exemplarily depicted in FIGS. 2-4. Useable color spaces may include the 1976 CIELUV, the 1960 CIE chromaticity diagram, the CIE 1931 red green blue (RGB) color space, the CIE 1931 XYZ color spaces, and/or another, suitable color space. A region on a chromaticity diagram may represent light sources having similar chromaticity coordinates. For example, FIG. 4 depicts generally red region 200, generally orange region 202, generally yellow region 204, generally green region 206, generally blue region 208, and generally purple region 210; but these are merely simplistic generalizations, as visible light comprising these colors is known to be continuously spread across the corresponding wavelengths. That is, chromaticity coordinates scale 99 may comprise a range of wavelengths, e.g., between 360 and 780 nm.

Figure 2:
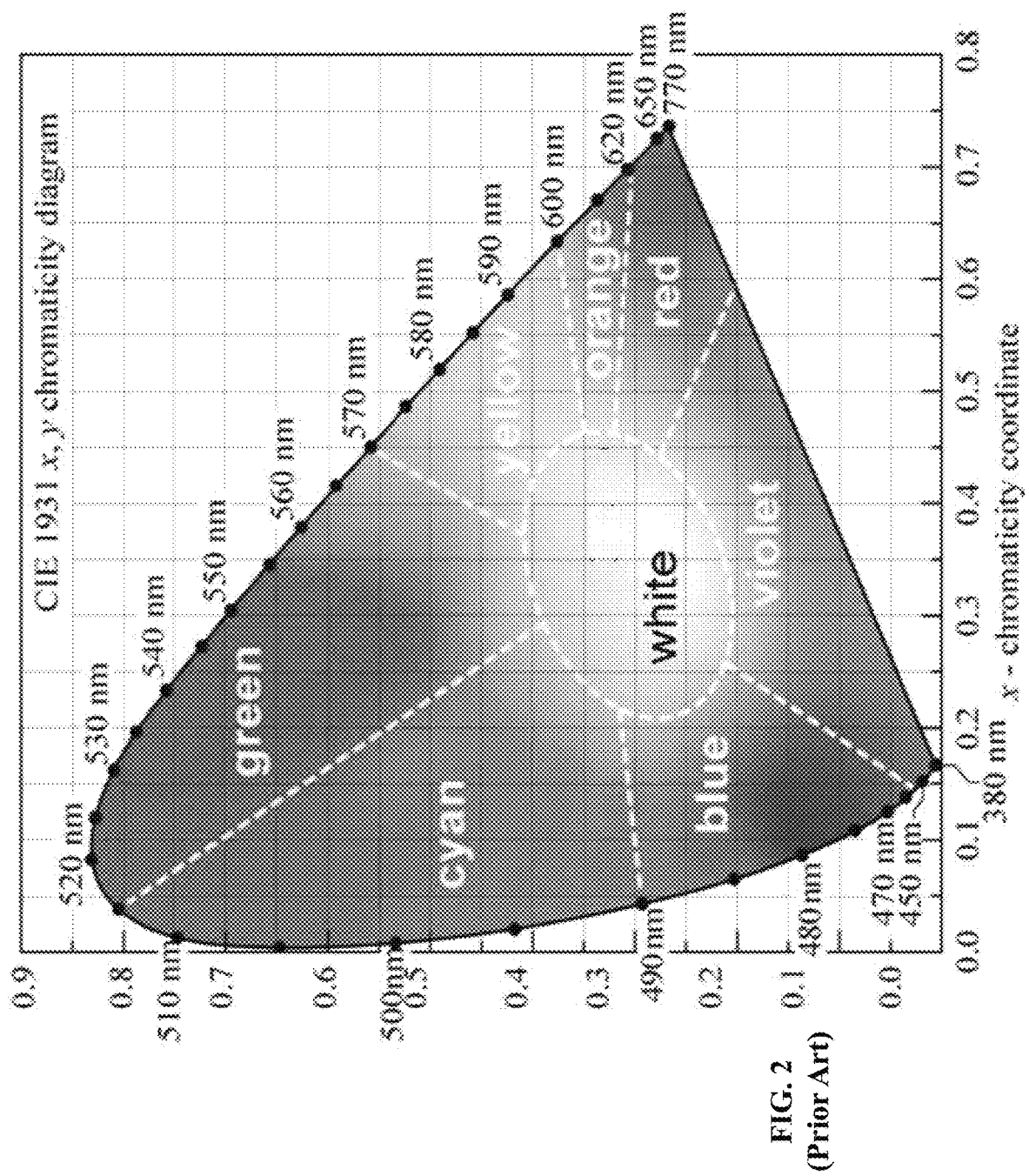
FIG. 2 illustrates a color space having regions for various different colors that may be provided by a display, in accordance with the prior art.

In some exemplary implementations, CCTs of 2700-3000 K are described as warm white, occupying a region with a yellower hue of white. And CC Ts of 3500-4000 K are described as neutral white, and CCTs of 4500-5500 K are described as cool white, for their bluish hue. FIGS. 2-4 depict the 1931 CIE chromaticity diagram. But this is not intended to be limiting, as the same features are contemplated to be depicted with a 1976 CIE chromaticity diagram. FIGS. 2-4 depict the 1931 CIE chromaticity diagram with x and y chromaticity coordinates, on the x and y axes, respectively, which map out the human color perception. The spectral colors are distributed around curved edge 99, which includes all of the hues perceived by the human eye. Curved edge 99 represents maximum saturation for the spectral colors, and the interior portion represents less saturated colors, including white light.

In some exemplary implementations, an EML ratio between cool and warm light modes may be at least 3:1, i.e., where the cool mode causes three or more times as much EML than the warm mode. For example, lighting control component 38 of processor(s) 20 may configure edge lighting 60 to generate different white points such that EML ratios between 3:1 and 250:1 are achievable, as discussed in greater detail below. Such light may prevent suppression of melatonin, in an actual or intended evening, and support a healthy sleep schedule. In some exemplary implementations, the cooler a light is the higher its EML because the cooler lights typically have more blue content.

In some exemplary implementations, the EML ratio may be tunable by dosing determination component 34 and/or lighting control component 38, e.g., by adjusting the ratio of melanopic/photopic (M/P) ratios corresponding to the different modes, as discussed below in greater detail. Edge lighting 60's M/P lux ratio may represent the impact on melanopsin response (melanopic lux) compared to the amount of perceived brightness (photopic lux).

In some exemplary implementations, edge lighting 60 may form part of a set of integrated circuits (ICs). In some exemplary implementations, edge lighting 60 may be implemented, e.g., using light-emitting diodes (LEDs), colored LEDs with no phosphor, phosphor-converted LEDs (e.g., from blue to green), organic LEDs (OLEDs), cold cathode fluorescent lamps (CCFL), mini LEDs, micro LEDs, quantum dots, lasers, or another suitable light source. In some exemplary implementations, lighting 60 may implement direct backlighting (also known as full-array), e.g., with LEDs placed behind display 50. In other implementations, edge lighting 60 may be edge-lit, e.g., with LEDs positioned along one or more sides of a screen.

In some exemplary implementations, edge lighting 60 may comprise mini (e.g., submillimeter) LEDs, this technology being between micro LED and standard LED technologies. Standard-sized LEDs (e.g., used in LCDs) are about 1,000 microns in size, whereas mini LEDs may be about 200 microns in size. The smaller size of mini LEDs may allow hundreds or even thousands to form edge lighting 60, an actual amount depending on a screen size (e.g., of capacitive touch screen 57).

In some exemplary implementations, a melanopic sensitivity curve is used with different densities along curved edge 99. For example, when component 34 is determining a dose that is to deliver a high amount EML, the light may be as close as possible to the densest part of curved edge 99. In another example, when component 34 is determining another dose that is to deliver a low amount EML, the light may be away from that densest part of curved edge 99. For determining a type of white light to be emitted, dosing determination component 34 may, by way of color mixing, create a dot on a color space of the light from edge lighting 60. And, by drawing a line (e.g., line 68 or 69) through this dot, the line may intersect curved edge 99. In some exemplary implementations, dosing determination component 34 may then rotate that line (e.g., line 68 or 69) around this dot.

In some exemplary implementations, light sources 65 of edge lighting 60 may emit colors, e.g., on line 68, 69, or any other line of a color space. These colors may be mixed in a certain ratio to achieve an intended color. As such, different amounts of EML may be provided by maintaining the same intended color. For example, dosing determination component 34 may determine a certain mode by drawing a predetermined line within which any set of colors may be provided, via edge lighting 60.

In some exemplary implementations, each light source 65 may be a single output of colored light. In other exemplary implementations, each light source 65 may be multi-colored, e.g., in a range of different colors. For example, each light source 65 may comprise a plurality LEDs or other light sources, which may be fabricated within a single package.

In some exemplary implementations, each light source 65 may illuminate a dot or sliver of light (e.g., in a color space) such that such that circadian stimulating energy (CSE) is provided to a reader, via one or more intensity-adjustable wavelength ranges. In some exemplary implementations, edge lighting 60 may provide a dot or sliver of illumination such that different CSE of different sets of wavelength ranges are provided to the reader. Different combinations of different sets of wavelength ranges may be provided to a reader, each wavelength range in a set having a predetermined power spectrum or waveform. In other exemplary implementations, each light source 65 may illuminate other dots or slivers. Each wavelength range is interchangeably referred to herein as a waveform or spectrum.

A high amount of EML may be emitted with light (e.g., dot or sliver) near, in, or around patterned-region 67 of the color space exemplary depicted in FIG. 4. But this depiction is not intended to be limiting, as any wavelength range of emitted light (e.g., within 480-490 nm or another wavelength range, such as those with respect to which CSE may be provided to the reader) may be considered biologically effective. For example, edge lighting 60 may provide, via a set of spectra, an amount of EML that satisfies one or more criteria. In this or another example, edge lighting 60 may provide, via another set of spectra, a different amount of EML that satisfies one or more other criteria.

The circadian system is very sensitive to short-wavelength (blue) light, with a peak spectral sensitivity at around 460 nm. In some exemplary implementations, dosing component 34 may determine a dosing comprising long blue light, with a wavelength of 480 nm to 490 nm. As such, dosing determination component 34 may replace the harmful blue light with beneficial blue light (and/or blue-enriched-white light), e.g., during the day when melatonin levels are naturally low. Some benefits to the reader of this or other provided light may include better memory consolidation, alertness, vigilance, and retention of verbal material. Dosing determination component 34 may help to cause a person to reset their biological clock.

In some exemplary implementations, dosing determination component 34 may generate a certain band of blue and/or ultraviolet that causes molecules in the reader's skin to break down into nitric oxide for reducing blood pressure. For example, dosing component 34 may determine a dosing that comprises CSE and/or LRNE based on an evaluation of component 32. In some exemplary implementations, dosing determination component 34 may generate a dosing that comprises cyan, with a wavelength of 490 nm to 520 nm. In these or other implementations, dosing determination component 34 may generate a (e.g., long) red light that helps with cellular regeneration.

In some exemplary implementations, dosing component 34 may determine dosing based on one or more physiological factors obtained by information component 30. These factors may include health conditions, emotional states, moods, energy, wellness factors, and/or another characteristic.

In some exemplary implementations, dosing component 34 may determine spectra for a reader that balances exposure of both artificial blue light and LRNE, e.g., to support wellness benefits similar to those from natural, sunlight exposure. For example, certain blue wavelengths of light may decrease blood pressure, increase blood flow, and improve overall endothelial function. As a result, systolic blood pressure and vascular resistance have been shown to decrease. In some exemplary implementations, dosing component 34 may determine dosing comprising different combinations of bands (e.g., which may be more beneficial than each individually), including different combinations of (i) visible light, (ii) IR, (iii) NIR, (iv) long or deep blue, and (v) cyan. One or more of these bands may be generated from a secondary emitter (e.g., IR and/or UV emittance) different from emissions of edge lighting 60.

In some exemplary implementations, dosing component 34 may determine one or more wavelength ranges, e.g., which provides biological activity. For example, the spectra may comprise a plurality of different peaks, each of the peaks being in a different one of the wavelength ranges. In some exemplary implementations, edge lighting 60 may provide health promoting light. In these or other exemplary implementations, edge lighting 60 may provide reading-comprehension-promoting light.

Figure 5:
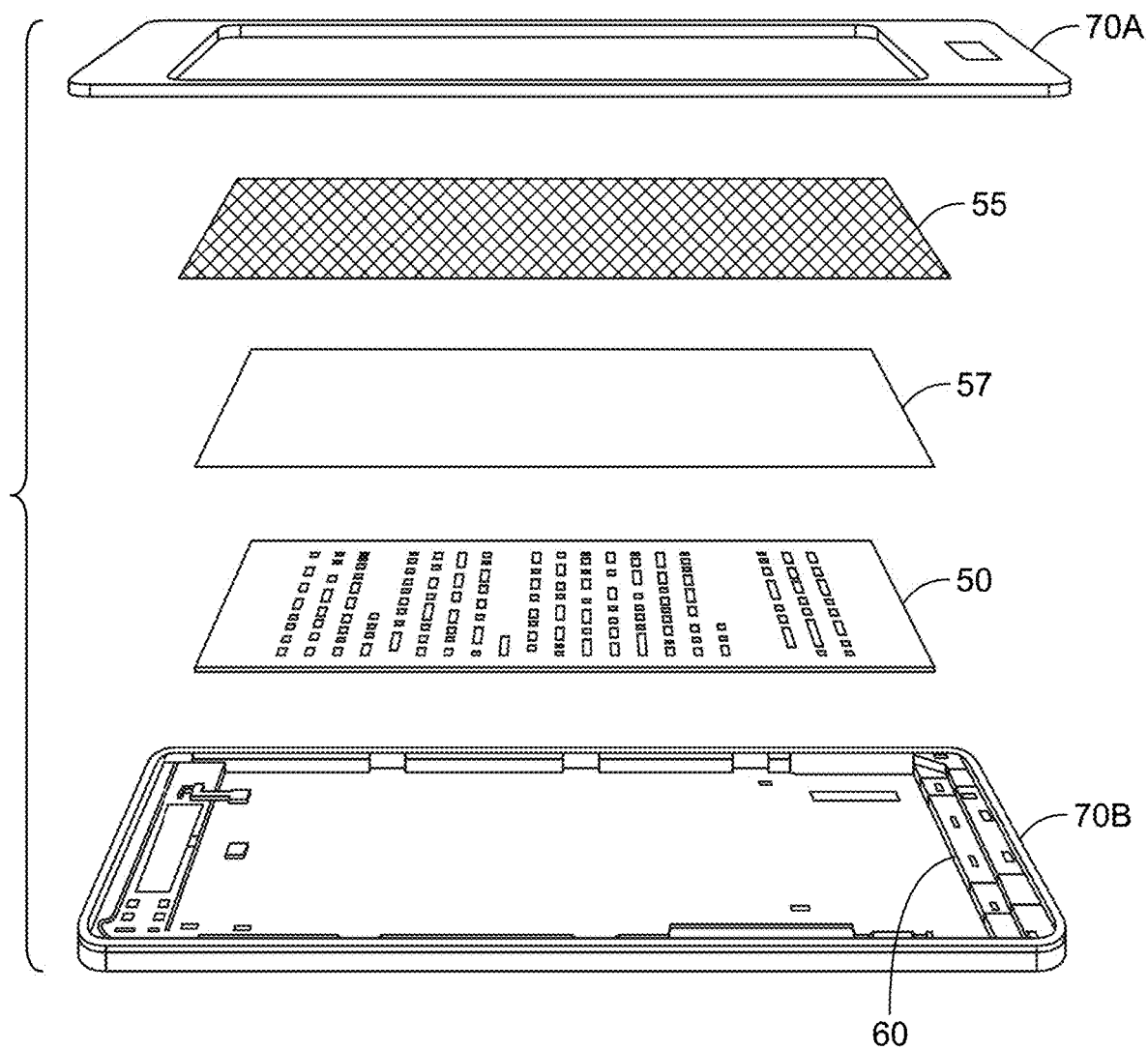
FIG. 5 illustrates an isometric view of lighting and display components that may be packaged together, in accordance with one or more exemplary implementations.

FIG. 5 exemplarily depicts a stack of components that are configured to be fitted within housing 70. More specifically, light guide 55, capacitive touch screen 57, and e-paper display 50 may be interposed between housing cover 70A and housing base 70B.

In some exemplary implementations, light guide 55 may be configured to support mixing of light from any number of sources 65. For example, light guide 55 may be configured to collect and transport light from light sources 65 to points at e-paper display 50, with minimal loss. That is, light may be transmitted through light guide 55 by means of total internal reflection. Light guide 55 may be made of one or more optical grade materials, such as acrylic resin, polycarbonate, epoxies, and glass.

Figure 8:
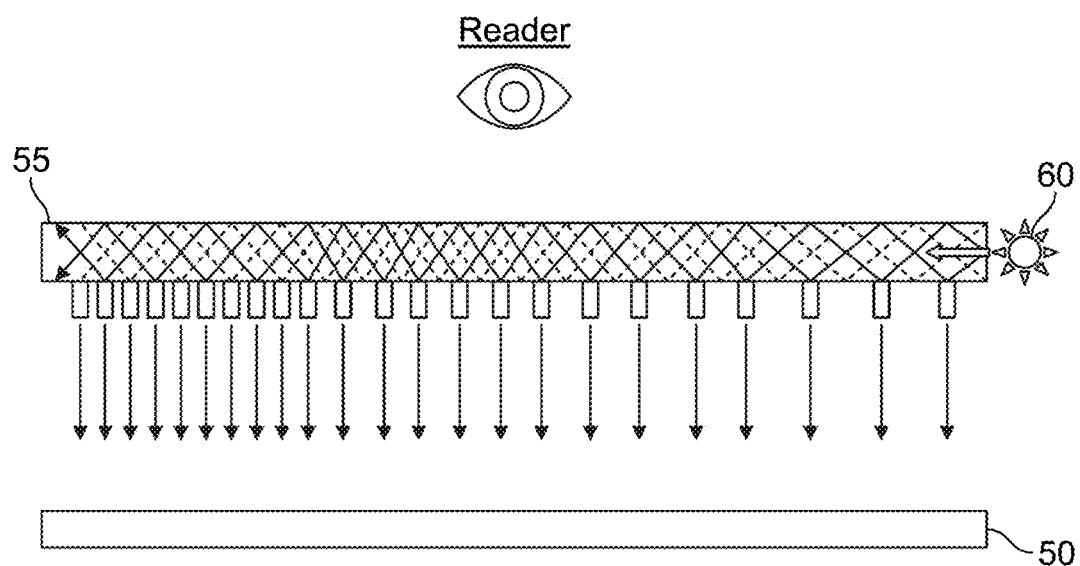
FIG. 8 illustrates the same edge-lighting configuration of FIG. 7 from a different perspective, in accordance with one or more exemplary implementations.

In some exemplary implementations, light guide 55 may be nano-imprinted. In some exemplary implementations, light guide 55 may act as a flattened fiberoptic cable, e.g., where light captured from edge lighting 60 is reflected internally until it exits through optical features imprinted onto light guide 55 downward towards e-paper display 50, as depicted in FIG. 8.

In some exemplary implementations, dosing determination component 34 may determine a dosing for each of one or more modes. For example, this component may determine a different dosing for one, two, or more than two modes. In examples where a plurality of modes are implemented, dosing determination component 34 may determine a plurality of intermediate modes, e.g., where a blend between warm and cool light modes is determined to be provided to a reader. The blend may contain dosing portions of one or more suitable kinds of mode extremes (e.g., EML-based, CSE-based, etc.). In some exemplary implementations, dosing determination component 34 may determine a dosing that is implemented via lighting control component 38 and edge lighting 60. More particularly, the dosing for each mode may be provided by a different set of light sources 65 or by a different combination of sets of light sources, each of the sets of light sources 65 being driven to different power levels. For example, in an implementation having two modes, a first set of light sources 65 may be driven to cause a first mode; and a second, different set of light sources 65 may be driven to cause a second, different mode. In another example, a same set of light sources 65 that produces a mode may be used to produce another, different mode. Light sources 65 may be dispersed evenly or irregularly across one or more edges of housing 70.

Figure 6:
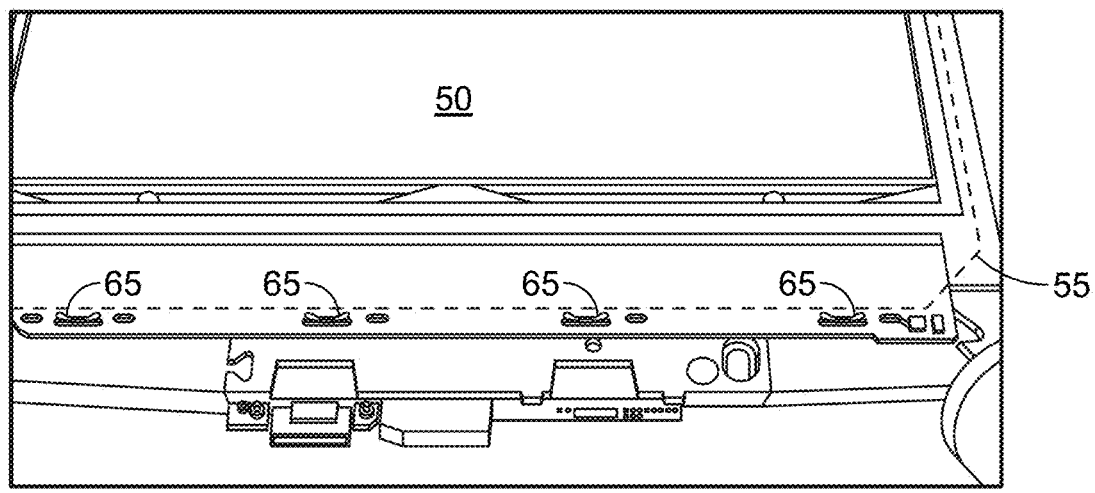
FIG. 6 illustrates an isometric view of an e-reader or another fixed, display device without a housing cover, in accordance with one or more exemplary implementations.

In some exemplary implementations, each set of light sources 65 may have any natural number of light sources. For example, each light source 65 may be a single light source, as depicted in FIG. 6. In another example, each light source 65 may comprise a plurality of light sources. In some exemplary implementations, a number of light sources 65 may be determined based on a number of wavelength ranges needed to provide a predetermined spectra (e.g., similar to or different from the spectra of FIGS. 10A-10D).

In some exemplary implementations, to generate the lighting of each of the two modes depicted in each of FIGS. 10A-10D, one or two light sources 65 may be used. That is, one light source 65 may generate the lighting of the maximum and/or minimum EML mode, or two light sources 65 may generate the lighting of the maximum and/or minimum EML mode. For this latter alternative, one light source 65 may produce the waveform having a peak at about 490 nm, and another light source 65 may produce the waveform having a peak at about 650 nm. The exemplary implementation of FIG. 6 depicts the contents of a display system without housing cover 70A.

In some exemplary implementations, each light source 65 may not need to be independently controllable, the color of each mode being unchangeable, when in that mode. For example, a same output color may be maintained in high and low EML modes, such as the target color depicted in FIG. 4. That is, lighting control component 38 and edge lighting 60 may cause a same look, when changing the melanopic content, e.g., potentially without readers being able to notice the change.

In some exemplary implementations, different pairs of light sources 65 for the two modes may result in lighting that is warm in low EML mode and cool in high EML mode. In exemplary implementations having four different types of light sources (e.g., with two different light sources for each of two modes), the power of a light-source pair (e.g., causing cool light) may increase or decrease as the power of another light-source pair (e.g., causing warm light) decreases or increases, respectively. For example, the former pair may gradually (e.g., over the course of an hour or two) decrease in power from morning to evening, as the latter pair gradually increases in power. But herein is contemplated other exemplary transitions, e.g., from high to low EML mode, that are more abrupt or even instantaneous transitions.

In some exemplary implementations, a channel emitting one color (e.g., cyan) and another channel emitting another color (e.g., deep red) may be driven to emit other colors (e.g., violet and yellow, respectively), when changing modes. That is, in exemplary implementations having different types of light sources, the wavelength/color and/or the SPD of each of these sources may be gradually or abruptly adjusted, e.g., when changing modes. Each different type of light may be characterized by a different waveform (e.g., due to a different SPD and/or different wavelength).

In some exemplary implementations, the herein disclosed light may be composed at the chip level of two distinct emitters, but these emitters may be configured such that there is a single channel, from a driver perspective.

In some exemplary implementations, light sources 65 may comprise backlighting (e.g., via a set of backlit LEDs or another, suitable light source), which may illuminate light pulses or otherwise provide CSE to a reader, the intensity and/or wavelengths being adjustable.

In some exemplary implementations, information component 30 may determine a time of day and/or a time of year based on a user device (e.g., watch, smart-watch, phone, smartphone, laptop computer, desktop computer, etc.) that is communicably coupled to or that comprises processor(s) 20. In other exemplary implementations, evaluation component 32 may determine a time of day and/or a time of year by calculating a phase angle between two clocks or oscillators and a rate of change of the phase angle. These two clocks or oscillators may be latched onto an indicator of evening (e.g., dusk) and morning (e.g., dawn), the morning one being very sensitive to an onset of light (e.g., since the reader at that time is likely to have been subjected to several hours of darkness).

In some exemplary implementations, lighting control component 38 may configure edge lighting 60 such that a cool, maximum EML mode is provided to a reader, effectively providing the reader a boost and a cue that informs their body that it was daytime. This high EML mode may be triggered based on an actual time of day or an intended time of day, such time being, e.g., in the morning. And then, in the evening, lighting control component 38 may trigger again to configure edge lighting 60 such that the light transitions to a low EML warm light, which may be less harmful to melatonin production in the reader and which may not inform their body that it was day time (since it may actually be nighttime). As such, a reader's circadian rhythm may be better supported. For example, a first set of spectra determined by component 34 may be configured to track an actual or intended dawn, and a second set of spectra determined by component 34 may be configured to track an actual or intended dusk.

In some exemplary implementations, an intended time of day may be the time of day to which the reader is trying to adjust (e.g., in transit on a plane or shuttle, while changing time zones).

In some exemplary implementations, edge lighting 60 may be adjusted (e.g., via a reader using UI device 18) such that a CCT of provided light becomes more or less warm. In one example, for office workers, lighting control component 38 and edge lighting 60 may cause a maximum EML at some point during the morning (e.g., between 8 AM and 12 PM). In another example, for a night shift worker, dosing determination component 34 may determine lighting based on the precise timing of this other reader's body clock such that the maximum EML is provided later in the day (e.g., from 3 PM to 7 PM). In one example, edge lighting 60 may cause a high EML in the morning at 10,000 K, and then slowly bring the white point temperature down to 6,000 K between 11 AM and 12 PM, and then between 12 PM and an end of a business day the temperature may stay the same. In this or another example, edge lighting 60 may, as a day progresses into an afternoon or evening, be configured to cause warmer white point temperatures and lower EML ratios.

In some exemplary implementations, lighting control component 38 may configure edge lighting 60 such that a 20:1 EML ratio between two high and low modes is met, without any significant change to the experience of the background color for the text. For example, the background may remain white or nearly white.

Figure 10A:
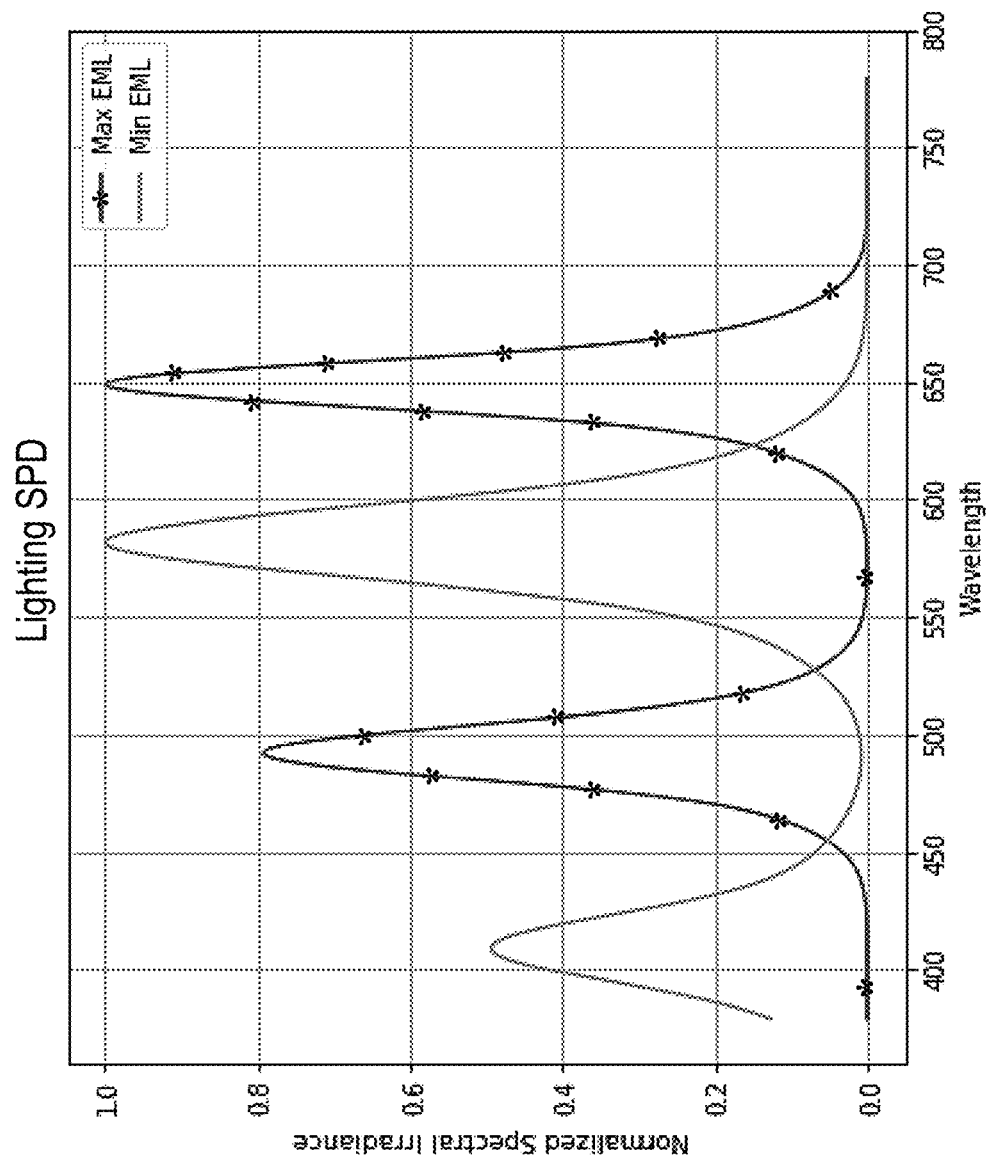
FIG. 10A illustrates two different sets of spectra for two different modes, in accordance with a first, least-biologically-active implementation.

In some exemplary implementations, lighting control component 38 may configure edge lighting 60 such that an EML ratio as low as 3:1 is provided between high and low modes, in a first exemplary implementation. A high (or maximum) EML mode of this first exemplary implementation may be accomplished with two waveforms of light having peaks at about 490 nm and 650 nm, respectively, such that a CCT level is 6,500 K (which is cool and which may be pure white). And a low (or minimum) EML mode of this first exemplary implementation may be accomplished with two waveforms of light having peaks at about 410 nm and 580 nm, respectively, such that a CCT level is 2,500 K (which is warm and which may be an orangish white, like a dimmed lightbulb). These modes are exemplarily depicted in FIG. 10A. FIG. 10A thus depicts the first exemplary implementation, wherein a low EML mode is provided with a certain spectra (e.g., a mixture or combination of violet and amber light) and a high EML mode is provided with another spectra (e.g., a mixture or combination of cyan and deep-red light).

In other exemplary implementations, an EML ratio between warm and cool light may be significantly more extreme. For example, in a second exemplary implementation, the warm light mode may have a temperature of 1,800 K (which is very warm white and which approximates candlelight), and the cool light mode may have a temperature of 10,000 K (which is very cool white and which may be a pale-bluish white). A high EML mode of this second exemplary implementation, which is exemplarily depicted in FIG. 10B, may be accomplished with two waveforms of light having peaks at about the same wavelengths as the high EML inducing waveforms depicted in FIG. 10A. That is, these waveforms may have peaks at wavelengths that are the same as the exemplary implementation depicted in FIG. 10A, except with different power levels; more particularly, the ratios between the two peaks may be different. In the first exemplary implementation, an M/P ratio of the warm light may be about 12.9%, and an M/P ratio of the cool light may be about 248%. In the second exemplary implementation, an M/P ratio of the warm light may be about 6.2%, and an M/P ratio of the cool light may be about 293%. A parameter ratio of these ratios is what determines the herein-termed EML ratio, e.g., with 248% divided by 12.9% resulting in a value of 19.2 for the first exemplary implementation. As such, the EML ratios may be 19.2 for the first exemplary implementation and 47.3 (i.e., 293/6.2) for the second exemplary implementation. In some exemplary implementations, dosing component 34 may determine different parameter (e.g., EML) ratios between different sets of spectra.

Figure 10B:
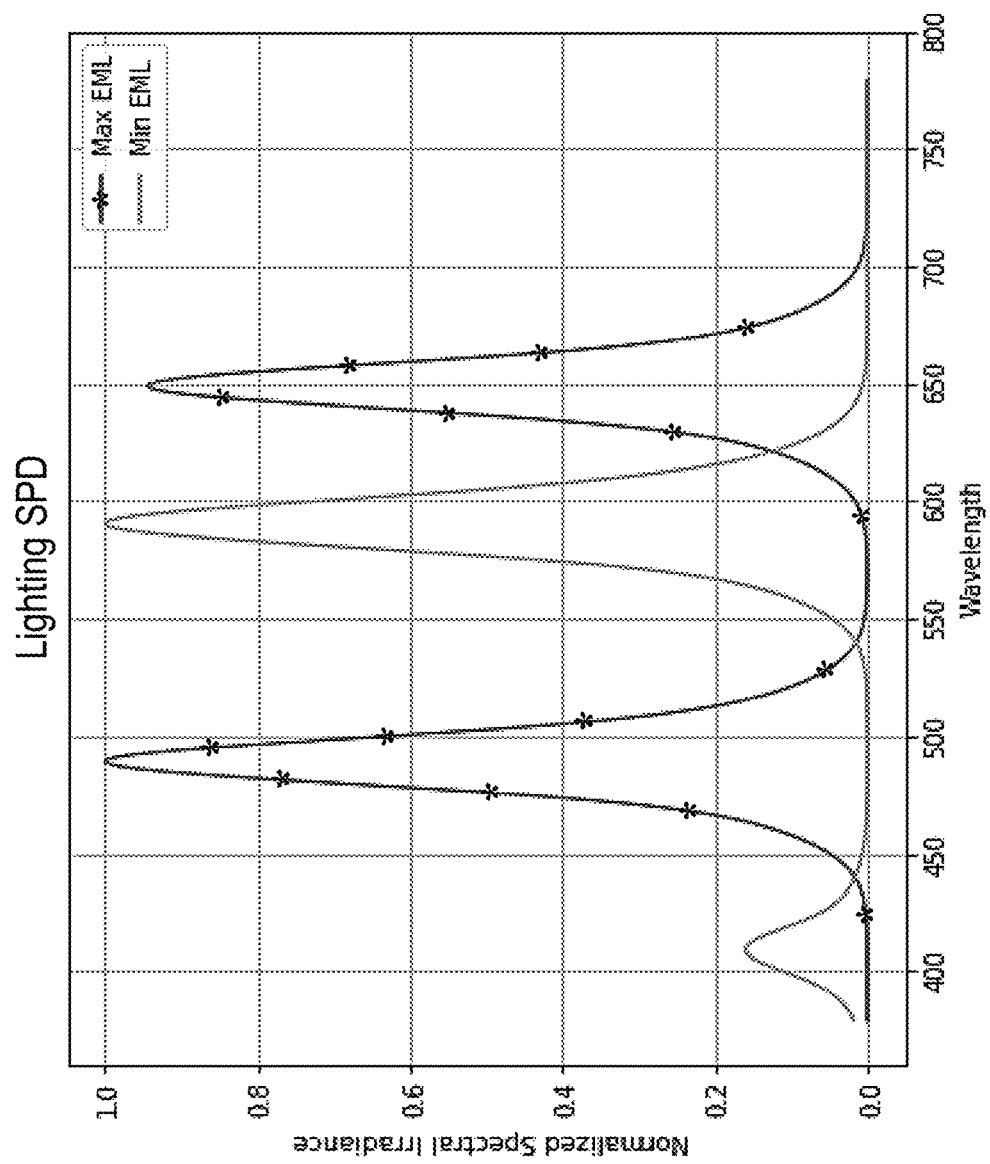
FIG. 10B illustrates two different sets of spectra for the two different modes, in accordance with a second, more-biologically-active implementation.
Figure 10C:
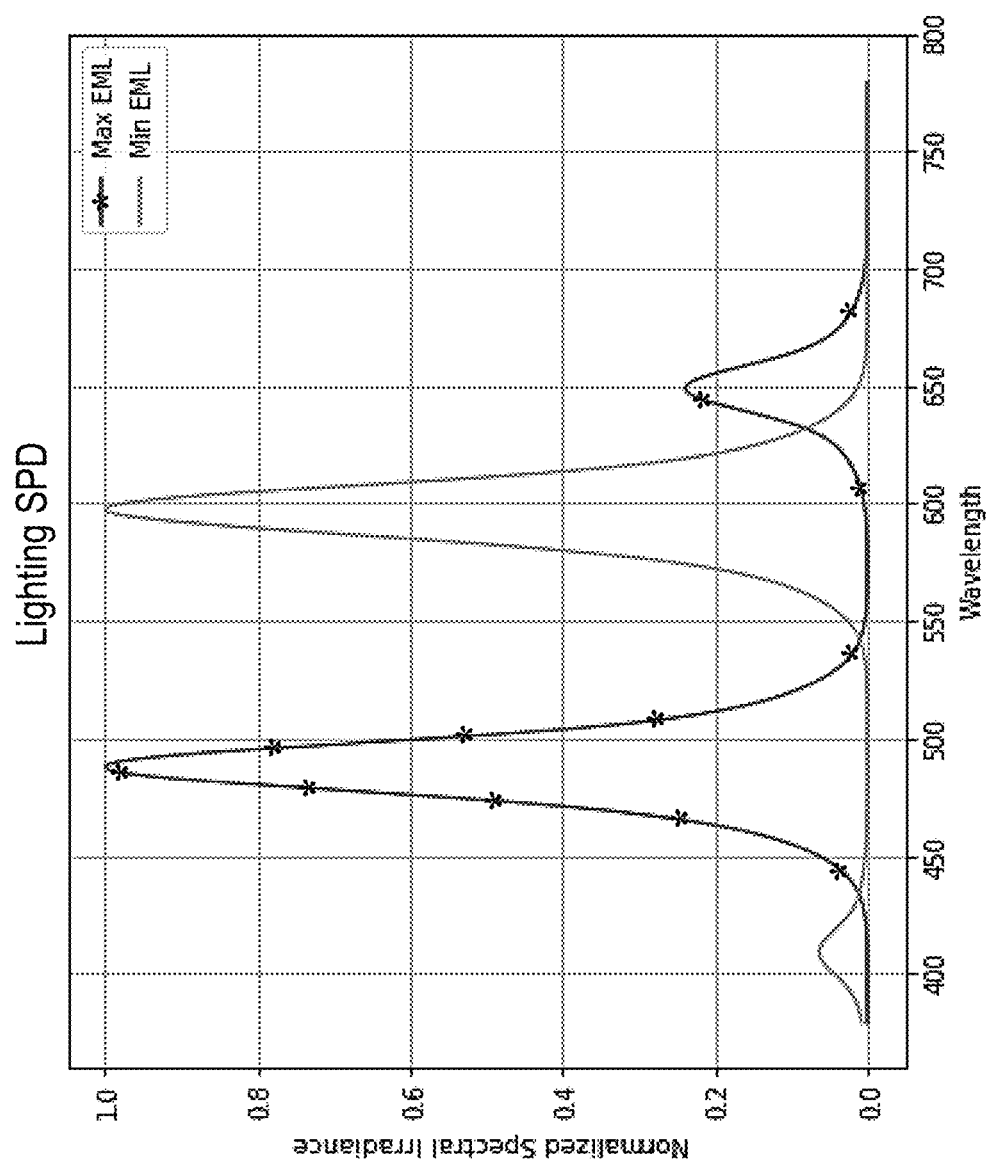
FIG. 10C illustrates two different sets of spectra for the two different modes, in accordance with a third, still-more-biologically-active implementation.
Figure 10D:
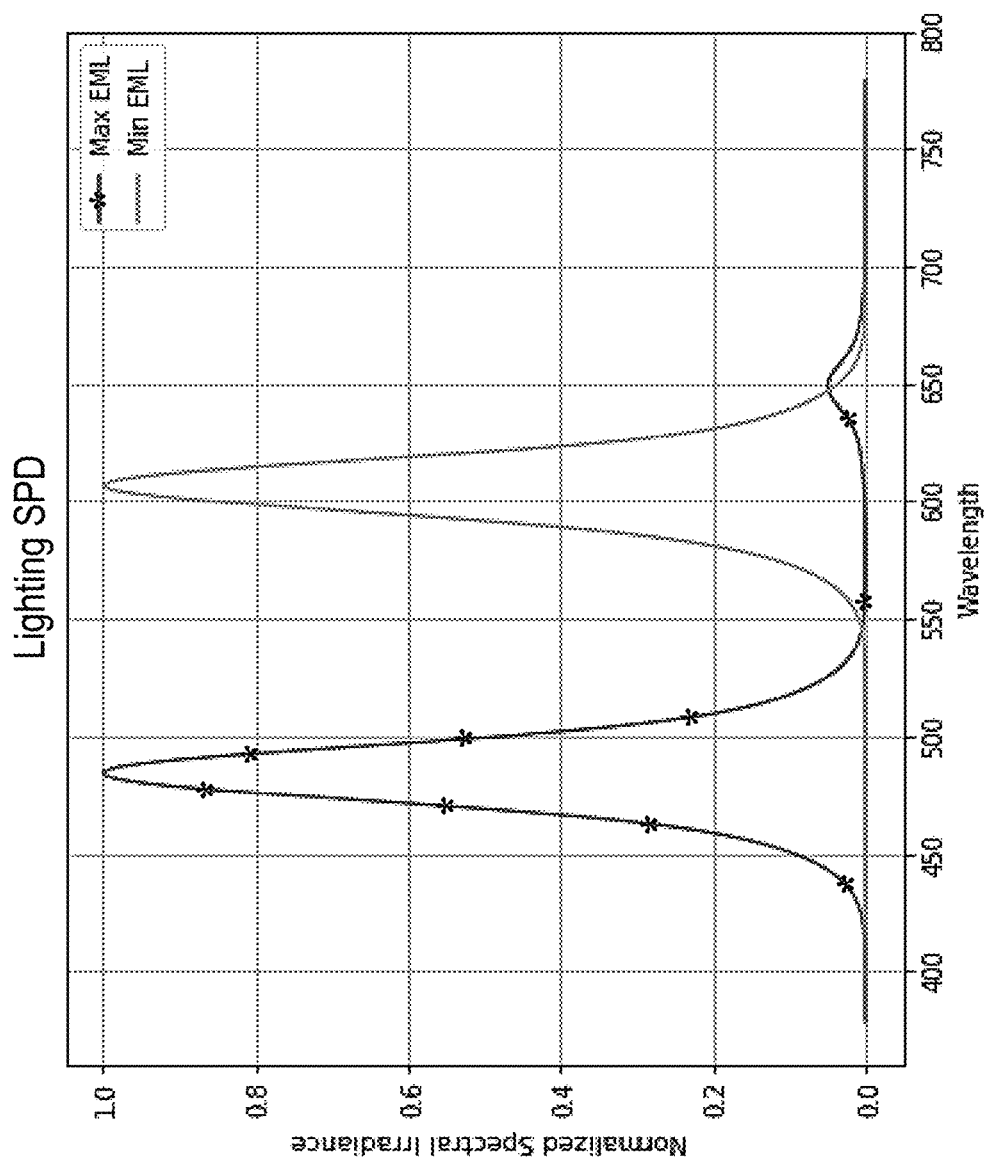
FIG. 10D illustrates two different sets of spectra for the two different modes, in accordance with a fourth, most biologically-active implementation.

A low (or minimum) EML mode of the second exemplary implementation depicted in FIG. 10B may be accomplished with two waveforms of light having peaks that each may be at a different wavelength and have a different SPD from the low/minimum EML waveforms exemplarily depicted in FIG. 10A. For example, the low/minimum EML mode of the second exemplary implementation may be accomplished with two waveforms of light having peaks at about 410 nm and 590 nm. The low or minimum EML waveforms of third and fourth exemplary implementations may similarly have different wavelengths and SPDs, with respect to the low or minimum EML waveforms of the first and second exemplary implementations.

The first and second exemplary implementations are thus not intended to be limiting, as other exemplary implementations are contemplated. For example, a ratio of M/P ratios of the warm and cool modes in a third, exemplary implementation may be 108. And this is because the M/P ratio for the warm mode may be 3.8%, and the M/P ratio for the cool mode may be 410%. More particularly, in this third exemplary implementation, lighting control component 38 may configure edge lighting 60 such that a CCT level is 1,500 K (which is very warm white and which may be orange), in the warm mode, and configure edge lighting 60 such that a CCT level is off-black-body towards cyan (which may be off-white and which may be a type of green or cyan), in the cool mode. That is, the cool mode CCT level may have Yuv color or brightness values of [400, 0.1, 0.4]. In another example, a ratio of M/P ratios of the warm and cool modes in a fourth, exemplary implementation may be 296. And this is because the M/P ratio for the warm mode may be 1.7%, and the M/P ratio for the cool mode may be 410%. More particularly, in this fourth exemplary implementation, lighting control component 38 may configure edge lighting 60 such that a CCT level is within 50 dUV of 1,500 K (which is warmest and which may be a type of red), in the warm mode, and configure edge lighting 60 such that a CCT level is off-blackbody towards cyan (which is coolest and which may be a type of green, blue, or cyan), in the cool mode.

The deviation of the UV value from the black body locus may be obtained as dUV. As such, the cool mode CCT level, in the fourth exemplary implementation, may have Yuv color or brightness values within 50 dUV of [400, 0.1, 0.4]. These two latter exemplary implementations may cause more extreme EML values by straying appreciably from traditional white points for illumination of e-paper display 50. The fourth exemplary implementation may provide a most amount of circadian entrainment, including deviations from white light that may have to be accepted by the reader.

In some exemplary implementations, dosing component 34 may determine a ratio between peaks of waveforms for a certain, biologically-active spectra. Although 10,000 K is shown as the coolest temperature in FIG. 3, dosing component 34 may determine this ratio that achieves a white point of greater than 10,000 K (e.g., 20,000 K, for a high EML or another mode). In some exemplary implementations, edge lighting 60 illuminates, e.g., in a range from red to orange to yellow to white to blueish white, a background with respect to e-paper display 50.

In the exemplary implementations that cause illumination for text that diverges from white, a reader may be required to cause selection (e.g., via UI device 18) of a value that determines the EML ratio, which may determine a level of circadian entrainment. For example, the level of circadian entrainment may be based on a maximum divergence from white light that is acceptably set by the reader (e.g., using UI device 18). In each of the first through four exemplary implementations (or in another contemplated, exemplary implementation), the M/P ratios may be determined by adjusting power levels of each waveform such that a certain ratio between the power levels is achieved. For example, the ratio of the waveform having a peak at 490 nm with the waveform having a peak at 650 nm is substantially different between FIGS. 10A and 10D.

The power distribution levels (i.e., normalized spectral irradiance, as shown on the Y-axis of FIGS. 10A-10D) of each of the wavelength ranges may be predetermined or user-adjustable (e.g., via UI device 18) to provide a different level of circadian entrainment. For example, peaks of pairs of waveform may be proportionately adjusted.

In some exemplary implementations, lighting control component 38 may adjust the SPD of various spectra, to positively affect the human circadian system. This adjustment or another adjustment may include modulating one or more of an intensity (e.g., power), wavelength, timing, and duration of exposure of the reader to this light. In some exemplary implementations, a brightness (e.g., luminous flux) and/or color parameters (e.g., chromaticity) of each light source 65 may be adjusted.

Figure 7:
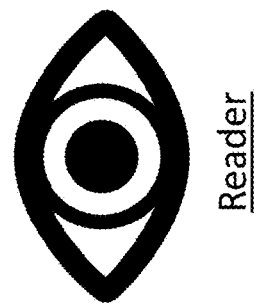
FIG. 7 illustrates edge-lighting of a light guide for illuminating the e-paper display for the reader, in accordance with one or more exemplary implementations.
Figure 7:
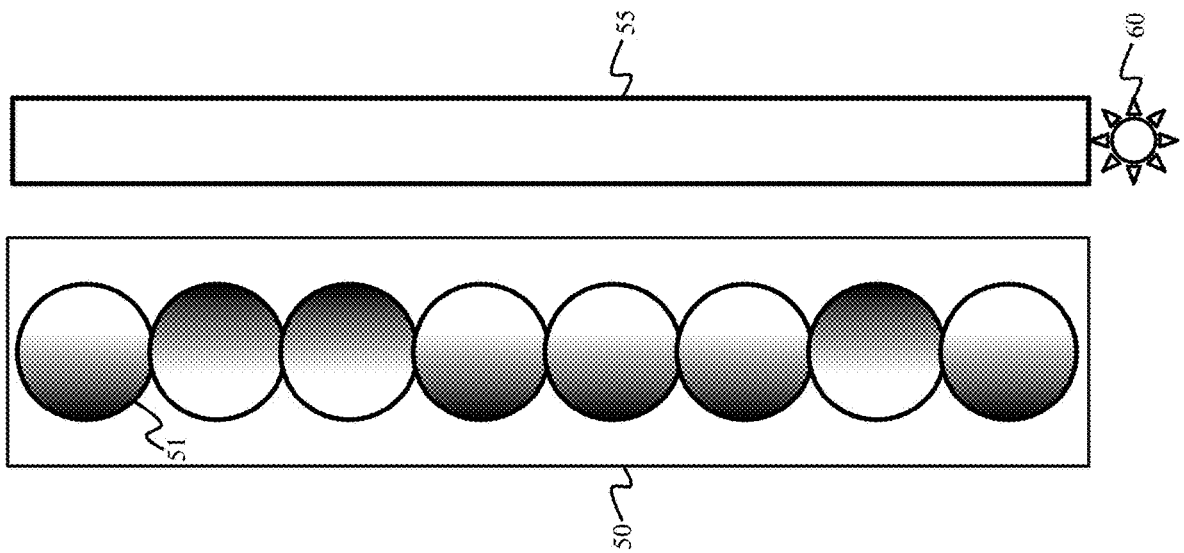

In some exemplary implementations, e-paper display 50 may display text, the display being illuminated from above by light 60 shining through light guide 55 and reflecting back to a reader's eyes, as depicted in FIG. 7. But this reflective configuration is not intended to be limiting, as transmissive configurations are also contemplated via edge lighting 60.

In some exemplary implementations, edge lighting 60 may be configured to cause cyan to be displayed around spheres 51 of e-paper display 50. For example, only one light source may accomplish that color display. In other exemplary implementation, lighting 60 may be configured to cause white light to be displayed around spheres 51. For example, a cyan illumination may be adjusted to white by adding an amount of a certain type of red. In this example, biological activity may be performed that satisfies a criterion (e.g., where a deep red light biologically affects a reader, such as to minimize wrinkles).

In some exemplary implementations, spheres 51 may not emit light, the pigment within them being instead reflective. In some exemplary implementations, e-reader display 50 may comprise a plurality of spheres 51, each comprising a plurality of different, light-reflective pigment spheres 52. For example, sphere 52A may be white, and sphere 52B may be black. Spheres 52 may be suspended in a fluid of sphere 51.

In some exemplary implementations, each of white spheres 52A may be a negatively charged pigment, and each of black spheres 52B may be a positively charged pigment; but this is not intended to be limiting, as the charge of these spheres may be opposite. Spheres 51 may also be referred to as capsules or microcapsules of any suitable shape, and spheres 52 may also be referred to as ink particles of any suitable shape. In some exemplary implementations, e-paper display 50 may comprise thousands or even millions of capsules 51, each of which potentially having a diameter on the order of a diameter of a human hair.

In some exemplary implementations, capsule 51 may only include one type of pigment particle 52 (e.g., black or white). In other exemplary implementations, capsule 51 may include a plurality of pigment particles 52 (e.g., black and white (B&W) or a set of colors). For example, spheres 52 may have other pigments, including a set of different colors that may be individually controllable by display control component 36. As such, e-paper display 50 may be monochrome or color.

Figure 9A:
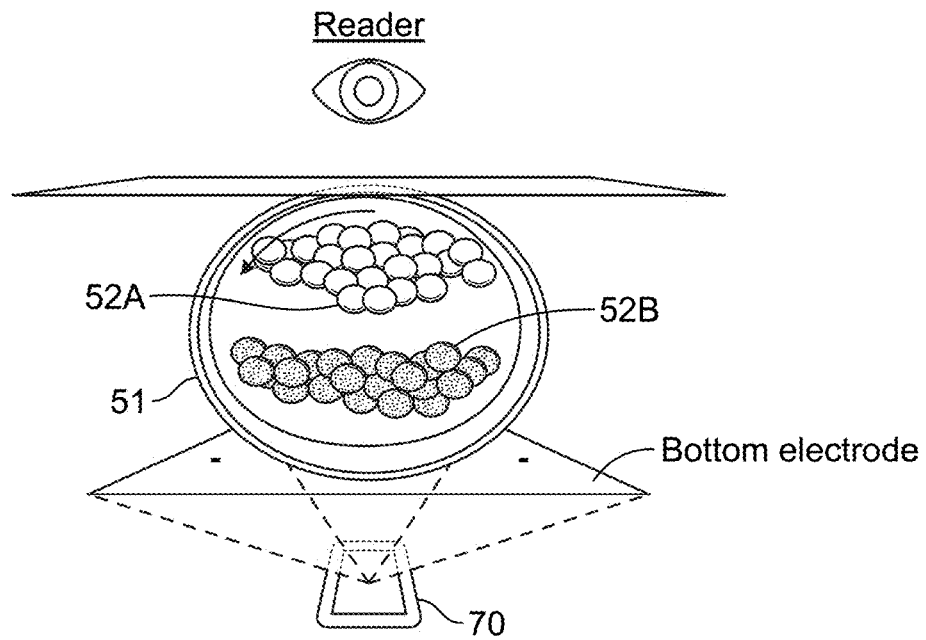
FIGS. 9A-9B each illustrate components of an e-paper display, in accordance with one or more exemplary implementations.
Figure 9B:
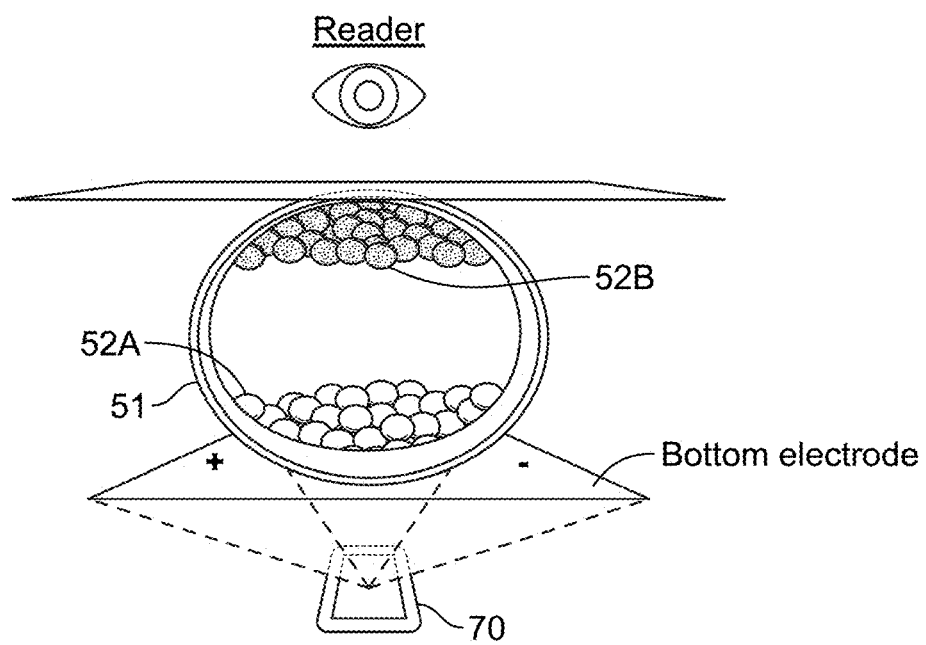

FIGS. 9A-9B show spheres 52 moving by means of charged electrodes that are configured by display control component 36. For example, in FIG. 9A the reader would see white due to the influence of a negative charge, whereas in FIG. 9B the reader would see black due to the influence of a positive charge. But this is not intended to be limiting as any suitable e-paper technology is contemplated, including ones where pigment configurations are adjusted by rotating spheres 51. For example, sphere 51 may be rotated, by display control component 36, such that a black side is what the reader sees (and vice versa rotation, in the other direction, for seeing a white side). In some exemplary implementations, display control component 36 may be configured to control the pigments of spheres 51 by causing the application of different electric fields using electrodes (e.g., plates) above and below each sphere 51. For example, this implementation may be electrophoretic. Other implementations of e-paper display 50 may include an electrowetting (e.g., electrofluidic) display, interferometric display, plasmonic electronic displays, organic transistor (e.g., embedded into a flexible substrate), or advanced color e-paper (ACePTM).

The depictions of FIGS. 9A-9B are not intended to be limiting, as not all ink particles of a certain charge are always expected to move together. Rather, in some exemplary implementations, half or other fractions of ink particles 52 of one pigment in capsule 51 may be adjusted based on control of display component 36. For example, the bifurcated charge to each capsule 51 may result in a half white and half black surface, which is closest to an eye of a reader and thus visible. By this approach, e-paper display 50 may maximize resolution and create more crisp or sharpened images.

As mentioned, housing 70 may comprise an AR or VR system. Such exemplary implementations may be transmissive or reflective. In some exemplary implementations, edge lighting 60 may be implemented via waveguides, micro prisms, cascade coated mirrors, or retinal lasers. For example, the AR may comprise diffractive waveguides or reflective waveguides. The AR or VR system may perform optical projection and interface with handheld devices. This system may be a headset, head-mounted display (HMD), eyeglasses, contact lenses, virtual retinal display, or another suitable fixture.

In some exemplary implementations, wearable sensor 40 may form part of a pendant, an armband, a wrist band, a dongle, a tag, a watch, a chest band, glasses, clothing, a headset, an activity tracker, and the like.

In some exemplary implementations, remote sensor 42 may include one or more ambient sensors of the reader's environment (e.g., car, office, room, shower, etc.) to collect information about the actual lighting conditions (e.g., room lighting and/or seasonal lighting conditions) in the environment, activities of occupants within the environment, and the like.

Any of the herein disclosed sensors may be implemented via wearable sensor(s) 40 and/or via remote sensor(s) 42. For example, these sensors may include one or more of a light exposure sensor, motion sensor, temperature sensor, video camera, IR sensor, microwave sensor, LIDAR, microphone, olfactory sensor, haptic sensor, bodily secretion sensor (e.g., pheromones), ultrasound sensor, and/or another sensing device.

In some exemplary implementations, system 10 may be designed for an operation that is coordinated with one or more external systems, e.g., room lighting, sound equipment, video and other entertainment systems, weather systems, climate systems, collective mood indicators (e.g., based on stock market data, news feeds, or sentiment indices), analyses of social network data, and other computer systems. In some exemplary implementations, edge lighting 60 may be configured to simulate a sunrise, a seasonal affective disorder (SAD) lamp, and/or a downlight. For SAD, the standard recommendation is 10,000 lux of 30 minutes. But some exemplary implementations may result in effective treatment (e.g., of SAD or in supporting circadian rhythms) with as low a light level as 100 lux (e.g., blue light) for 20 minutes.

In some exemplary implementations, edge lighting 60 and e-paper display 50 may be controlled by processor(s) 20, which can communicate various lighting levels, timing, and configuration, e.g., to achieve the desired bioactive lighting. For example, display properties may vary based on one or more of a determined time of day, determined time of year, a determined geolocation of housing 70 at this time, an intended effect of the lighting, an estimated body clock of the reader, individual preferences, capabilities of the underlying device, a feedback mechanism, sensor input, and/or another factor.

Edge lighting 60 may be used treat or otherwise affect a reader's biological system and cycles of the exposed reader throughout the day in different ways. For example, lighting control component 38 may automatically, semi-automatically, or manually adjust, via edge lighting 60, the reader's light exposure (e.g., based on sensor data, activity data, social media data, etc.). As such, system 10 may be an autonomous control system that automatically adjusts display parameters. For example, system 10 may include an operational feedback system based on a collection of information about the actual lighting conditions (e.g., soliciting and receiving user feedback and/or desired changes).

Inputs from wearable devices may be used in the operational feedback system, such as to measure reactions to lighting conditions (such as to enable automated adjustment of a lighting installation), as well as to measure impacts on mood, health conditions, energy, wellness factors, and the like.

In some exemplary implementations, information component 30 may obtain input information from one or more of readers (e.g., via UI device 18), a server (e.g., accessible via external resources 24), a database (e.g., electronic storage 22), a decisioning engine (e.g., a component of processor 20), and a sensor (e.g., sensors 40 and/or 42). For example, information component 30 may obtain live speech or stored voice recordings such that evaluation component 32 assesses a reader's tone or mood and that dosing determination component 34 adjusts a lighting dose based on the same.

In some exemplary implementations, information component 30 may obtain data (e.g., physiological) about a reader, via wearable sensor(s) 40 and/or remote sensor(s) 42 and/or via UI device 18. This data may include an acceleration of the reader, a location of the reader (e.g., GPS-based or via another positioning system), an orientation or angular velocity (e.g., gyroscope-based) of the reader, ambient light characteristics to which the reader is exposed, steps walked by the reader, a sleep history of the reader, a heart rate of the reader, a blood pressure of the reader, a room temperature, a personal temperature, oxygen saturation of the reader, activity type of the reader, activity level of the reader, galvanic skin response, respiratory rate, cholesterol level, a barometric pressure, localized lighting conditions, lighting spectrum characteristics, humidity, UV light, sound (e.g., ambient noise measured in decibels), particles, pollutants, gases, radiation, hormonal or adrenal levels of the reader (e.g., cortisol, thyroid, adrenaline, melatonin, and others), histamine levels, immune system characteristics, blood alcohol levels, drug content, macro and micro nutrients, mood, emotional state, alertness, sleepiness, and/or other attributes related to the reader. As such, some exemplary implementations of dosing determination component 34 may manage doses across a plurality of lighting data, including usage of a desk lamp, work monitor, home monitor, mobile phone, smart glasses, and/or overhead office bulbs. This management may even be based on such factors as ambient sound levels and health metrics (e.g., blood pressure, stress level, etc.) of the reader.

In some exemplary implementations, information component may obtain social media data related to readers, e.g., including social networks (e.g., Facebook™, LinkedIn™, Twitter™, and the like), sources of medical records (e.g., 23&Me™ and the like), productivity, collaboration and/or calendaring software (e.g., Google™, Outlook™, scheduling apps and the like), information about web browsing and/or shopping activity, activity on media streaming services (e.g., Netflix™, Spotify™, YouTube™, Pandora™ and the like), health record information and other sources of insight about the preferences or characteristics of readers of e-paper display 50, including psychographic, demographic, and other characteristics. Accordingly, emissions from edge lighting 60 may be based on previous exposure(s) to light by a reader, one or more demographics (e.g., ethnicity) of the reader, and/or one or more other demographics (e.g., an age, including children of teen years and/or younger, who may suffer from greater melatonin suppression even when exposed to a same set of lighting) of the reader.

In some exemplary implementations, dosing component 34 may determine a dosing based on any data obtained by information component 30. This data may be reader-supplied (e.g., via UI device 18) parameters, such as personal information (e.g., sex, age, etc.), health goals, and light emission targets.

In some exemplary implementations, evaluation component 32 may measure, via wearable sensor 40 and/or remote sensor 42, physical activity, ambient noise, a hormonal level, and/or an insulin level, with respect to the reader. Dosing determination component 34 may then adjust one or more display properties based on these measurement(s) satisfying one or more criteria. For example, one such criterion may be a noise threshold above which stress of the reader increases and sleep is liable for disruption.

In some exemplary implementations, evaluation component 32 may measure, via wearable sensor 40 and/or remote sensor 42, an exposure of the reader to a cyan wavelength over at least one first time frame and/or an exposure of the reader to an LRNE wavelength over at least one second time frame. Dosing determination component 34 may then adjust one or more display properties based on the measurement(s) satisfying one or more criteria. The contemplated LRNE wavelengths, which may be provided via dosing determination component 34, lighting control component 38, and edge lighting 60, may be the same as the ones listed in Tables A-1, A-2, and/or A-3 of International Patent Application No. PCT/US2019/060634, the entire contents of which are incorporated herein by reference.

In some exemplary implementations, evaluation component 32 may train a machine learning model using much sensor data accumulated from many different readers or from much data of a same reader. This model may learn patterns from the sensors' outputs to better determine operating parameters associated with edge lighting 60.

In some exemplary implementations, dosing component 34 may determine spectra to be provided at eye(s) of a reader, e.g., with a maximum of 580 lux (1×) or greater. Text displayed on e-paper display 50 may satisfy a visibility criterion based on an intensity of the light In some exemplary implementations, edge lighting 60 may be configured to emit one or more of LRNE and CSE, in a range from constant-on to a set of micro-pulses each with a duration less than 1.0 or 0.1 seconds(s). Light pulses may be used to provide bioactive exposure to a set of readers. One or more of such pulses may have a frequency between 10 Hz and 0.5 MHz. An amount of emitted pulses may vary from a single pulse up to 400,000 pulses (or more). The SPD and intensity may each remain constant or vary, during this or other set of pulse-train emissions. In some exemplary implementations, dosing component 34 may determine a pulse train comprising any suitable waveform of light (e.g., short duration pulses, long duration pulses, square waves, sine waves, based on a variable signal, and/or based on another pattern).

In some exemplary implementations, lighting control component 38 may utilize one or more high intensity light sources (e.g., LEDs or another lighting technology) for pulsing light trains. These one or more light sources may be the same as edge lighting 60 or a different set of light sources mounted anywhere within housing 70 or even in another housing that is communicably coupled to processor(s) 20. In some exemplary implementations, dosing component 34 may determine light pulse trains, each comprising one or more wavelength ranges.

In some exemplary implementations, the light pulse train may comprise light pulses intermittently emitted (e.g., every few seconds, such as 0.1 Hz). Each pulse may be very bright (e.g., a bright cyan flash that is brighter than the background lighting) but because the pulse may be of very short duration a biological effect may still be provided, while still being tolerable for reading. For example, for treating conditions like SAD, light pulse trains may be provided by edge lighting 60 or another source, while the reader is reading text from e-paper display 50 at a certain timeframe of a day (e.g., which may have an aggregate duration less than an hour).

The portion of dosing determination component 34, which determines emissions of light pulse trains, may be a standalone device that includes an emitter. In other exemplary implementations, a light-pulse emitter may be integrated into housing 70.

In some exemplary implementations, background lighting and/or the light pulse trains may provide a certain type of red light (e.g., LRNE) to offset or to serve as an antidote some of the side effects of a certain type of blue light.

The herein disclosed light pulse trains may be used in an active phase shifting (e.g., to deal with jet lag, whether before, during, or after a time-zone shift), a personal device (e.g., to adjust an individual), an aircraft lighting system (e.g., to adjust the passenger and crew to a destination time-zone), a mental health treatment (e.g., to treat SAD, depression, ADHD, Alzheimer's, autism, or another disease), supporting normal circadian rhythms in healthy population, stabilization of rhythms using closed loop control (e.g., when integrated with biosensors), hospitals, health and wellness, space stations, space craft (e.g., in manned trips to Mars or any other extra-terrestrial place) that lack in a normal 24 hour light-dark cycle, and easing people out of bed (e.g., by suppressing melatonin before they need to wake up while not disrupting their sleep). In some exemplary implementations, dosing component 34 may determine emissions that provide benefits better than nature (e.g., via pulses and other lighting approaches that perform better than mere sunlight exposure, such as by balancing and/or controlling an exposure of both artificial blue light and LRNE to support wellness benefits).

The inventors have observed that a body's circadian system is optimally sensitive to short pulses of light, with fairly long periods of darkness in between. The herein disclosed light pulse trains may match or even exceed the phase shifting abilities of continuous light, when matched for intensity. In some configurations, the duty cycle may be as low as 1/100,000, effectively minimizing an amount of energy consumed in this health benefiting implementation. The inventors have further observed that pulse trains may be used on sleeping people to modify their circadian rhythm, without disturbing their sleep architecture.

In some exemplary implementations, dosing determination component 34 may prioritize dosing, e.g., from between emissions that promote sleep health and emissions that promote brain health, effectively providing different recipes of light. These different recipes may be modified using independent parameter sliders on a UI.

Figure 11:
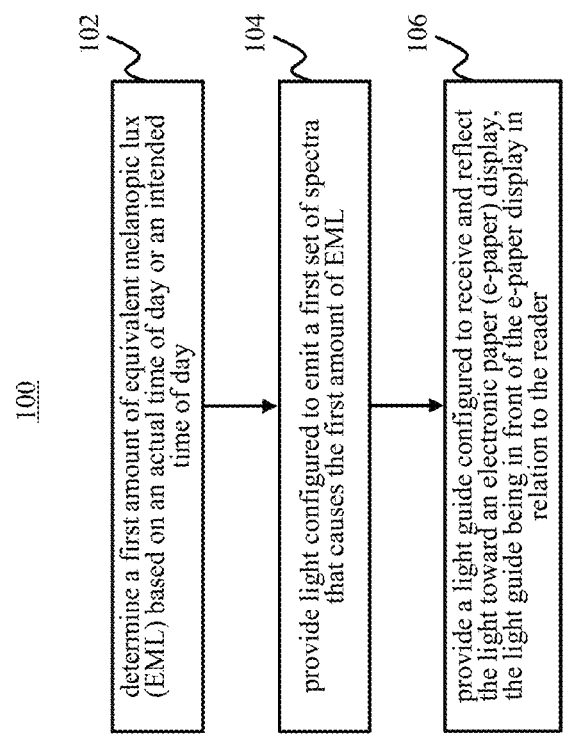
FIG. 11 illustrates a process for controlling lighting of the e-paper display, in accordance with one or more exemplary implementations.

FIG. 11 illustrates method 100 for controlling an edge-lit display based on certain time(s) of day, in accordance with one or more exemplary implementations. Method 100 may be performed with a computer system comprising one or more computer processors and/or other components. The processors are configured by machine readable instructions to execute computer program components. The operations of method 100 presented below are intended to be illustrative. In some exemplary implementations, method 100 may be accomplished with one or more additional operations not described, and/or without one or more of the operations discussed. Additionally, the order in which the operations of method 100 are illustrated in FIG. 11 and described below is not intended to be limiting. In some exemplary implementations, method 100 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of method 100 in response to instructions stored electronically on an electronic storage medium. The processing devices may include one or more devices configured through hardware, firmware, and/or software to be specifically designed for execution of one or more of the operations of method 100.

At operation 102 of method 100, a first amount of equivalent melanopic lux (EML) may be determined based on an actual time of day or an intended time of day. In some exemplary implementations, operation 102 is performed by a processor component the same as or similar to dosing determination component 34 and to information component 30 or evaluation component 32 (shown in FIG. 1 and described herein).

At operation 104 of method 100, light configured to emit a first set of spectra may be provided to a reader, which causes the first amount of EML. In some exemplary implementations, operation 104 is performed by edge lighting 60 and a processor component the same as or similar to lighting control component 38 (e.g., as shown in FIG. 1 and described herein).

At operation 106 of method 100, a light guide configured to receive and reflect the light toward an e-paper display may be provided, the light guide being in front of the e-paper display in relation to the reader. In some exemplary implementations, operation 106 is performed by obtaining or manufacturing light guide 55 and e-paper display 50.

Techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

Several exemplary implementations of the invention are specifically illustrated and/or described herein. However, it will be appreciated that modifications and variations are contemplated and within the purview of the appended claims.

What is claimed is:

1. A method for impacting biological activity of a reader, comprising:
    determining a first amount of equivalent melanopic lux (EML) based on an actual time of day or an intended time of day;
    causing one or more first light sources to emit a first light having said first amount of EML to illuminate an electronic paper (e-paper) display;
    causing one or more long red and near infrared energy (LRNE) light sources to emit LRNE light from said e-paper display, said LRNE light being at least one of long red light or near infrared (NIR) light.

2. The method of claim 1, wherein primary light is emitted from said e-paper display using a light guide to reflect said primary light, said light guide being in front of said e-paper display.

3. The method of claim 1, wherein said primary light is a white light.

4. The method of claim 3, wherein said one or more LRNE light sources are integral to one or more primary light sources for providing a red component in said white light.

5. The method of claim 1, wherein said one or more LRNE light sources are independent of said one or more primary light sources.

6. The method of claim 1, wherein said long red light ranges from 625 nm to 700 nm, and NIR light ranges from 700 nm to 1400 nm.

7. The method of claim 1, wherein said long red light has a peak wavelength 640-670 nm.

8. The method of claim 1, wherein said NIR light has a peak wavelength 850 nm, 940 nm, or 1064 nm.

9. The method of claim 1, wherein said one or more LRNE light sources emit both long red light and NIR light.

10. The method of claim 1, wherein said long red light and NIR light provide at least one of visible LRNE and non-visible LRNE.

11. The method of claim 10, wherein said visible LRNE is light having spectral power in wavelengths between about 625 nm and about 700 nm, and said non-visible LRNE is light having spectral power in wavelengths greater than or equal to about 700 nm.

12. The method of claim 1, wherein one or more primary light sources comprise at least a first channel comprising two different first light sources configured to emit a first combined light having said first equivalent melanopic lux (EML) and a second channel comprising two different second light sources configured to emit a second combined light having a second EML, wherein said second EML is greater than said first EML.

13. The method of claim 12, wherein said first and second combined light have the same color point.

14. The method of claim 12, wherein said first and second channels are configured to operate in one or two modes, a low EML mode in which said first channel is powered and said second channel is turned off, and a high EML mode in which said second channel is powered and said first channel is turned off.

15. The method of claim 12, wherein said first and second levels of EML is further determined based on, at least in part, time of year.

16. A method for impacting biological activity of a reader, comprising:
    determining a first amount of equivalent melanopic lux (EML) based on an actual time of day or an intended time of day;
    causing one or more primary light sources to emit a primary light having said first amount of EML to illuminate an electronic paper (e-paper) display;
    wherein said primary light sources emits said first light in pulses; and
    causing one or more long red and near infrared energy (LRNE) light sources to emit LRNE light from said e-paper display, said LRNE light being at least one of long red light or near infrared (NIR) light.

17. The method of claim 16, wherein each of said pulses has a duration less than 0.1 second.

18. The method of claim 16, wherein said primary light is a white light.

19. The method of claim 18, wherein said one or more LRNE light sources are integral to one or more primary light sources for providing a red component in said white light.

* * * * *